United States Patent
Kim et al.

(10) Patent No.: US 11,237,596 B2
(45) Date of Patent: Feb. 1, 2022

(54) FOLDABLE ELECTRONIC DEVICE

(71) Applicant: Samsung Electronics Co., Ltd., Gyeonggi-do (KR)

(72) Inventors: Kukhwan Kim, Gyeonggi-do (KR);
Kyungjin Lee, Gyeonggi-do (KR);
Byungchan Lee, Gyeonggi-do (KR);
Youngsang Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/894,003

(22) Filed: Jun. 5, 2020

(65) Prior Publication Data
US 2020/0387195 A1 Dec. 10, 2020

(30) Foreign Application Priority Data

Jun. 5, 2019 (KR) .......................... 10-2019-0066956

(51) Int. Cl.
*G06F 1/16* (2006.01)
*G09F 9/30* (2006.01)

(52) U.S. Cl.
CPC .......... *G06F 1/1652* (2013.01); *G06F 1/1618* (2013.01); *G06F 1/1681* (2013.01); *G09F 9/301* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,125,759 B2* | 2/2012 | Fukuma | ................ | F16M 11/10 |
| | | | | 361/260 |
| 8,804,324 B2* | 8/2014 | Bohn | .................... | G06F 1/1681 |
| | | | | 361/679.27 |
| 9,176,535 B2* | 11/2015 | Bohn | .................. | H04M 1/0268 |
| 9,690,330 B2* | 6/2017 | Kim | ...................... | G06F 1/1677 |
| 9,798,359 B2* | 10/2017 | Seo | ........................ | G06F 1/1652 |
| 9,841,050 B2* | 12/2017 | Hsu | .......................... | F16B 2/22 |

(Continued)

FOREIGN PATENT DOCUMENTS

| | | |
|---|---|---|
| CN | 207975120 | 10/2018 |
| KR | 1020150037383 | 4/2015 |

(Continued)

OTHER PUBLICATIONS

International Search Report dated Sep. 28, 2020 issued in counterpart application No. PCT/KR2020/007360, 10 pages.

*Primary Examiner* — Lisa Lea-Edmonds
(74) *Attorney, Agent, or Firm* — The Farrell Law Firm, P.C.

(57) ABSTRACT

An electronic device is provided. The electronic device includes a housing including a first body and a second body, a flexible display disposed such that at least a portion of the flexible display is exposed through a first surface of the housing, a multi-link cover connected to the first body and the second body, and including a plurality of joint parts pivotably coupled to each other, and at least one hinge structure, at least a portion of which is located in an interior of the multi-link cover and foldably connecting the first body and the second body. The multi-link cover has a height that is substantially the same as heights of the first body and the second body and the plurality of joint parts are connected to each other by shafts disposed to cross each other.

20 Claims, 22 Drawing Sheets

(56) References Cited

U.S. PATENT DOCUMENTS

| | | | |
|---|---|---|---|
| 9,898,051 B2* | 2/2018 | Cho | G06F 1/1652 |
| 10,013,028 B2* | 7/2018 | Ahn | G09F 9/301 |
| 10,062,362 B2* | 8/2018 | Kwak | G06F 1/1626 |
| 10,070,546 B1* | 9/2018 | Hsu | H05K 5/0017 |
| 10,082,839 B1* | 9/2018 | Turchin | G06F 1/1681 |
| 10,114,424 B2* | 10/2018 | Campbell | E05D 3/06 |
| 10,117,346 B2* | 10/2018 | Yang | H05K 5/0086 |
| 10,120,415 B2* | 11/2018 | Seo | G06F 1/1652 |
| 10,143,098 B1* | 11/2018 | Lee | H05K 5/0017 |
| 10,185,367 B2* | 1/2019 | Kim | G06F 1/1675 |
| 10,234,907 B2* | 3/2019 | Knoppert | G06F 1/1652 |
| 10,310,566 B2* | 6/2019 | Liao | G06F 1/1652 |
| 10,314,184 B2* | 6/2019 | Choi | G09F 9/301 |
| 10,347,852 B2* | 7/2019 | Myeong | G06F 1/1652 |
| 10,359,809 B2* | 7/2019 | Kwak | G06F 1/1692 |
| 10,383,239 B2* | 8/2019 | Lee | H05K 5/0217 |
| 10,390,444 B2* | 8/2019 | Choi | H05K 5/0017 |
| 10,420,233 B2* | 9/2019 | Lee | H05K 5/0017 |
| 10,429,894 B2* | 10/2019 | Xia | G06F 1/1649 |
| 10,429,904 B2* | 10/2019 | Turchin | G06F 1/1641 |
| 10,506,153 B2* | 12/2019 | Kang | H04M 1/0241 |
| 10,530,913 B2* | 1/2020 | Park | H04M 1/0268 |
| 10,575,415 B2* | 2/2020 | Shin | H01L 51/0097 |
| 10,585,457 B2* | 3/2020 | Park | H01L 27/323 |
| 10,645,205 B2* | 5/2020 | Lee | H04M 1/0268 |
| 10,694,623 B2* | 6/2020 | Park | G06F 1/1616 |
| 10,727,435 B2* | 7/2020 | Kim | G06F 1/1601 |
| 10,736,225 B2* | 8/2020 | Choi | G06F 1/1616 |
| 10,847,735 B2* | 11/2020 | Seo | G09F 13/24 |
| 10,921,864 B2* | 2/2021 | Choi | G09F 9/301 |
| 10,925,176 B2* | 2/2021 | Lee | E05D 3/18 |
| 10,948,947 B2* | 3/2021 | Yoon | G06F 1/1652 |
| 10,959,341 B2* | 3/2021 | Choi | H05K 5/0017 |
| 10,963,012 B2* | 3/2021 | Shin | G06F 3/0412 |
| 10,968,673 B2* | 4/2021 | Aagaard | H04M 1/0216 |
| 11,023,009 B2* | 6/2021 | Kim | H04M 1/0268 |
| 2013/0135809 A1 | 5/2013 | Uchiyama et al. | |
| 2015/0361696 A1 | 12/2015 | Tazbaz | |
| 2016/0014914 A1* | 1/2016 | Stroetmann | G06F 1/1681 312/223.1 |
| 2016/0179236 A1 | 6/2016 | Shin et al. | |
| 2018/0145269 A1* | 5/2018 | Myeong | H01L 51/0097 |
| 2018/0329460 A1* | 11/2018 | Song | G06F 1/1681 |
| 2018/0373297 A1* | 12/2018 | Liao | G06F 1/1601 |
| 2019/0082544 A1* | 3/2019 | Park | G09F 9/301 |
| 2019/0204879 A1* | 7/2019 | Park | G06F 1/1652 |
| 2019/0280226 A1* | 9/2019 | Myeong | G06F 1/1616 |
| 2020/0196461 A1* | 6/2020 | Shin | H04N 5/64 |
| 2020/0218311 A1* | 7/2020 | Park | G06F 1/1681 |
| 2020/0233464 A1* | 7/2020 | Lee | H04M 1/0268 |
| 2020/0321551 A1* | 10/2020 | Kim | H05K 5/0086 |
| 2020/0359515 A1* | 11/2020 | Choi | G06F 1/1652 |
| 2020/0383219 A1* | 12/2020 | Hale | E05D 3/18 |

FOREIGN PATENT DOCUMENTS

| | | |
|---|---|---|
| KR | 1020170087008 | 7/2017 |
| KR | 1020170088956 | 8/2017 |
| KR | 101880266 | 8/2018 |
| KR | 1020190001864 | 1/2019 |
| WO | WO 2018/203614 | 11/2018 |

* cited by examiner

FOLDABLE ELECTRONIC DEVICE

CROSS-REFERENCE TO RELATED APPLICATION(S)

This application is based on and claims priority under 35 U.S.C. 119 to Korean Patent Application Serial No. 10-2019-0066956, filed on Jun. 5, 2019, in the Korean Intellectual Property Office, the entire disclosure of which is incorporated herein by reference.

BACKGROUND

1. Field

The present disclosure relates generally to a foldable electronic device.

2. Description of Related Art

As digital technologies have developed, electronic devices have come to be provided in various forms, such as smartphones, tablet personal computers (PCs), and personal digital assistants (PDAs). Electronic devices have been developed to be carried by or mounted on users so as to improve portability thereof and access thereto by the users.

In recent years, as display-related technologies have developed, electronic devices including flexible displays have been developed. Such flexible displays may be used in the form of flat surfaces, and may also be deformed into specific forms and used in that state. Electronic devices including flexible displays may be realized in foldable forms whereby the electronic devices may be folded or unfolded with respect to at least one folding axis.

The folding electronic device may include a bending structure (e.g., a hinge structure and a hinge cover that covers the hinge structure) that folds or unfolds a first housing and a second housing. The bending structure may have a complex structure, and may have a large size (e.g., thickness) compared with the first housing and the second housing. In this way, the bending structure may be a factor that mars the design (e.g., the quality of an external appearance, such as a step) of the foldable electronic device or lowers the durability thereof

SUMMARY

The present disclosure has been made to address at least the disadvantages described above and to provide at least the advantages described below.

In accordance with an aspect of the present disclosure, an electronic device is provided. The electronic device includes a housing including a first body and a second body, a flexible display disposed such that at least a portion of the flexible display is exposed through a first surface of the housing, a multi-link cover connected to the first body and the second body, and including a plurality of joint parts pivotably coupled to each other, and at least one hinge structure, at least a portion of which is located in an interior of the multi-link cover and foldably connecting the first body and the second body. The multi-link cover has a height that is substantially the same as heights of the first body and the second body and the plurality of joint parts are connected to each other by shafts disposed to cross each other.

In accordance with an aspect of the present disclosure, an electronic device is provided. The electronic device includes a housing including a first body and a second body, a flexible display disposed such that at least a portion of the flexible display is exposed through a first surface of the housing, a first slide structure slidably coupled to the first body, a second slide structure slidably coupled to the second body, a multi-link cover connected to the first slide structure and the second slide structure, and including a plurality of joint parts pivotably coupled to each other, and at least one hinge structure, at least a portion of which is located in an interior of the multi-link cover, connected to the first slide structure and the second slide structure, and foldably connecting the first body and the second body. The multi-link cover has a height that is substantially the same as heights of the first body and the second body and the plurality of joint parts are connected to each other by shafts disposed to cross each other.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
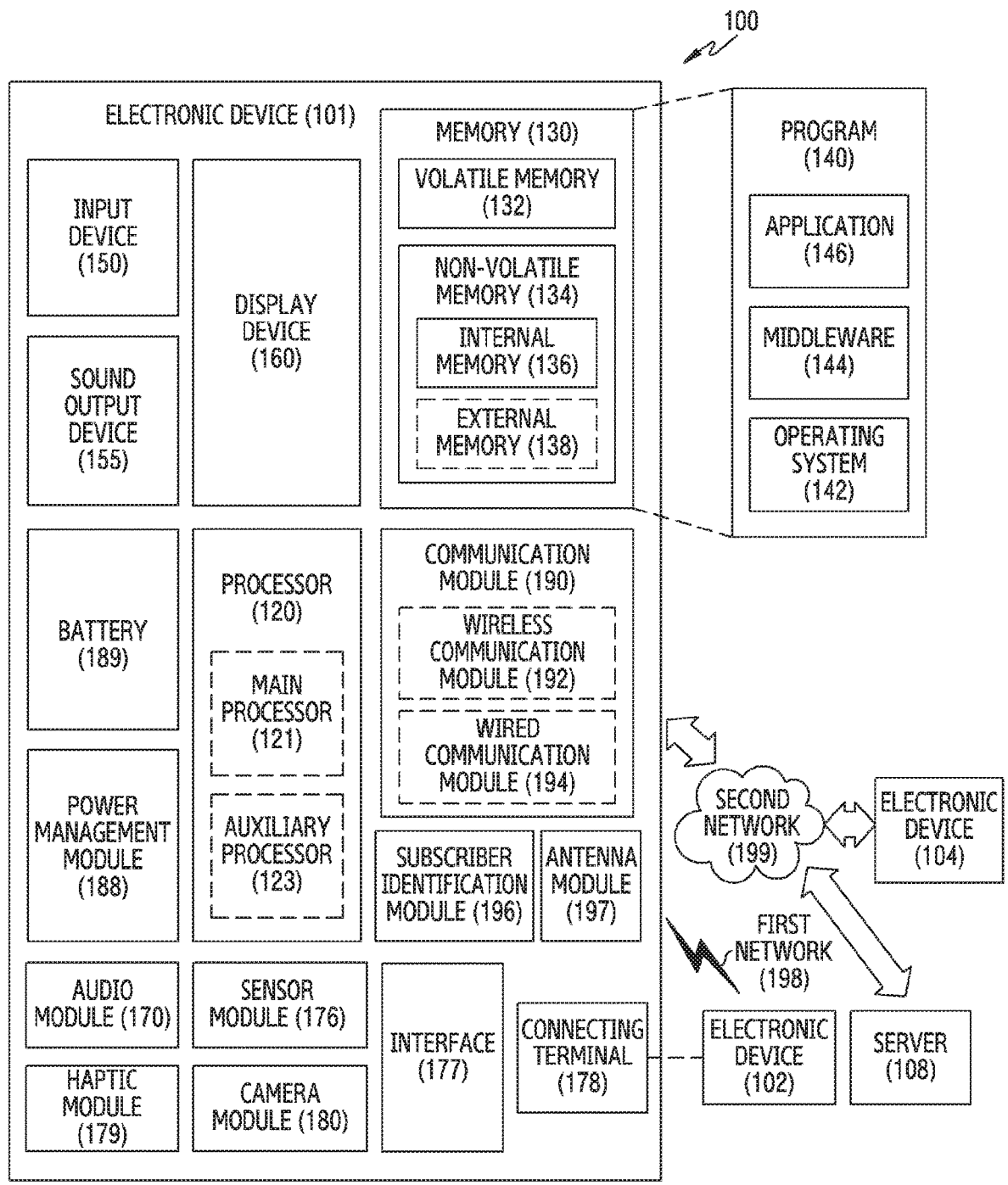
FIG. 1 is a block diagram of an electronic device in a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

An electronic device according to the disclosure may include at least one of, for example, a smart phone, a tablet PC, a mobile phone, a video phone, an electronic book reader (e-book reader), a desktop PC, a laptop PC, a netbook computer, a workstation, a server, a PDA, a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TVM, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

FIG. 1 is a block diagram illustrating an electronic device 101 in a network environment 100, according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The auxiliary processor 123 may be a secure processor that is operated in a secure execution environment (SEE). The processor 120 may further include a memory (e.g., a general memory or a secure memory) (hereinafter, a second memory) connected to the secure processor and configured to store data that requires security. The main processor 121, the secure processor, and the second memory may be formed of one chip (e.g., a system on chip (SoC)).

In some embodiments, the main processor 121 and the secure processor may be formed of one chip, and the secure memory connected to the secure processor may be formed of a separate configuration.

Figure 2A:
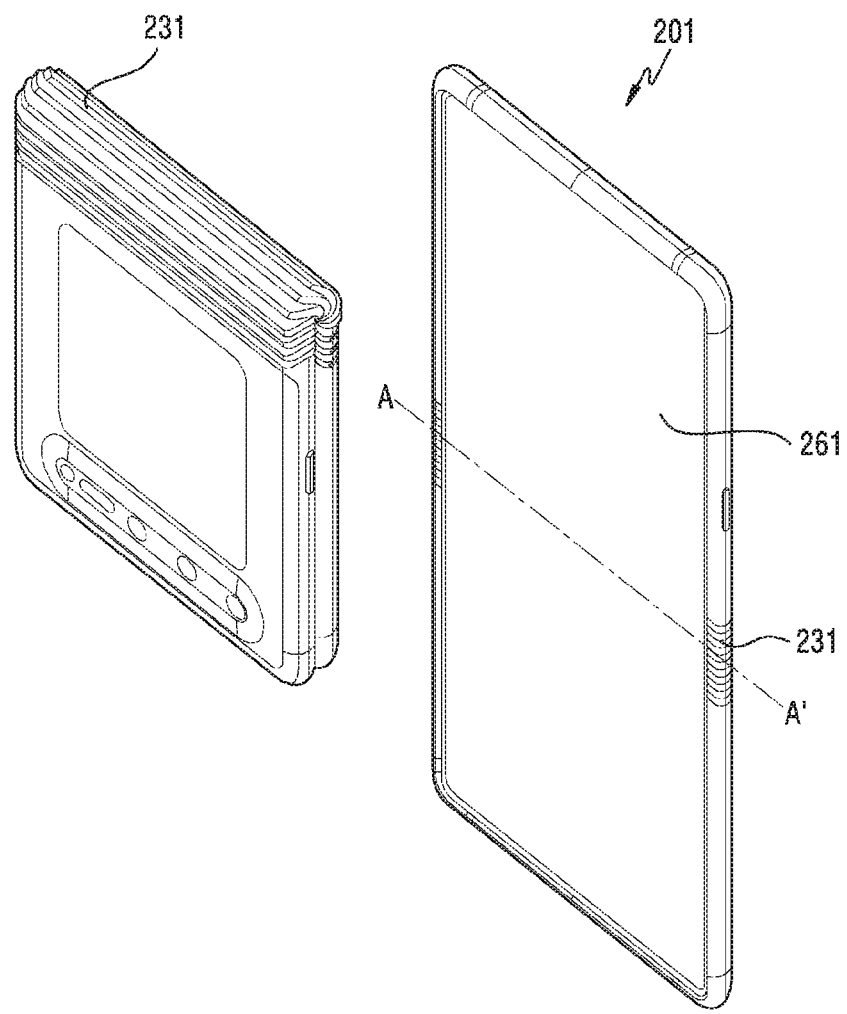
FIG. 2A is a view illustrating an electronic device, according to an embodiment.
Figure 2B:
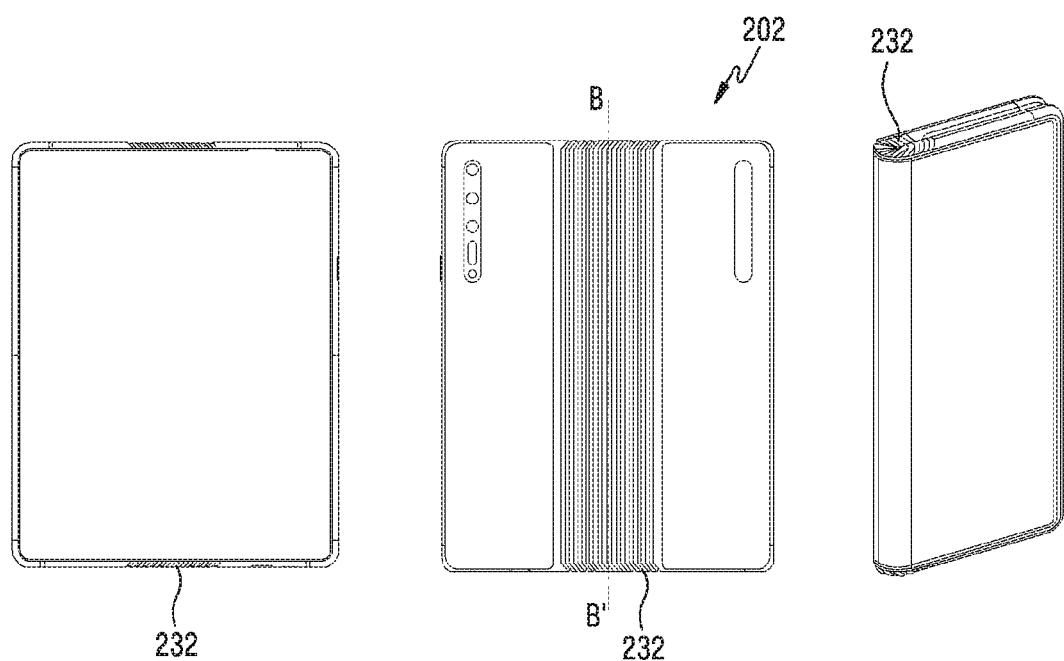
FIG. 2B is a view illustrating an electronic device, according to an embodiment.
Figure 2C:
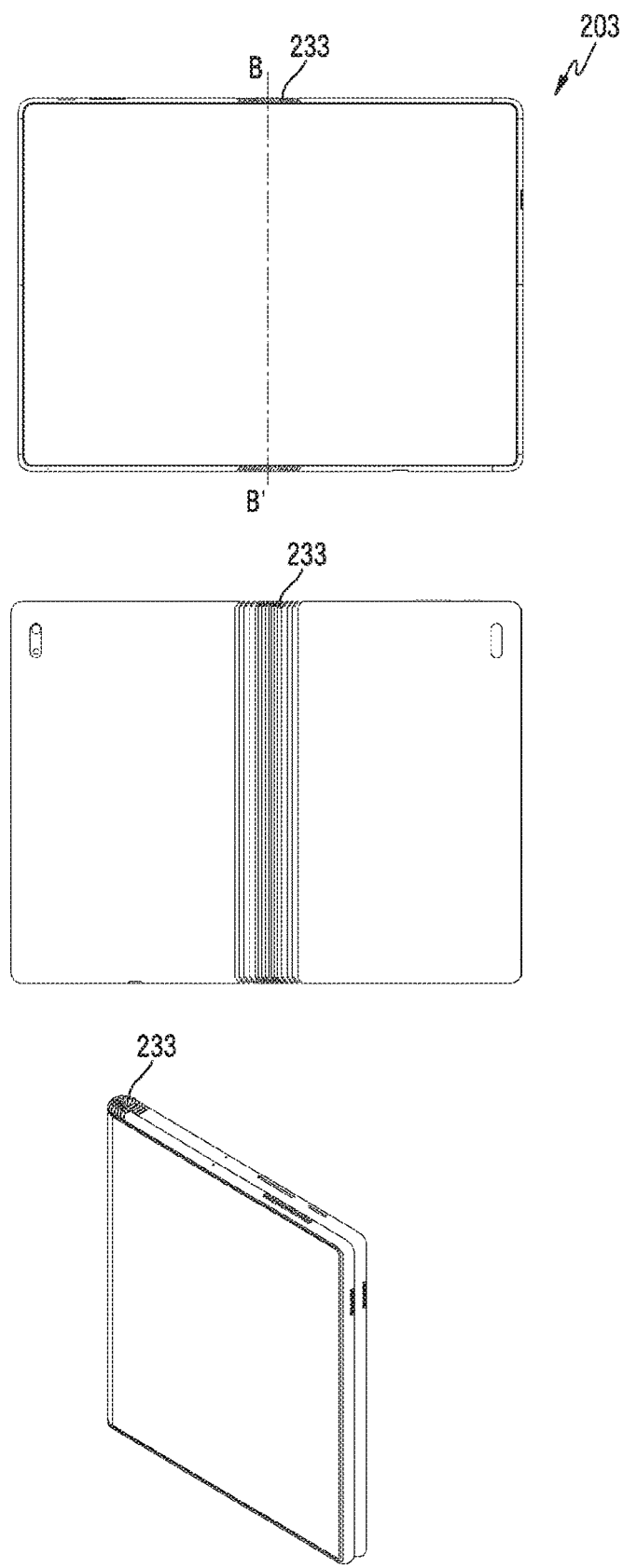
FIG. 2C is a view illustrating an electronic device, according to an embodiment.
Figure 2D:
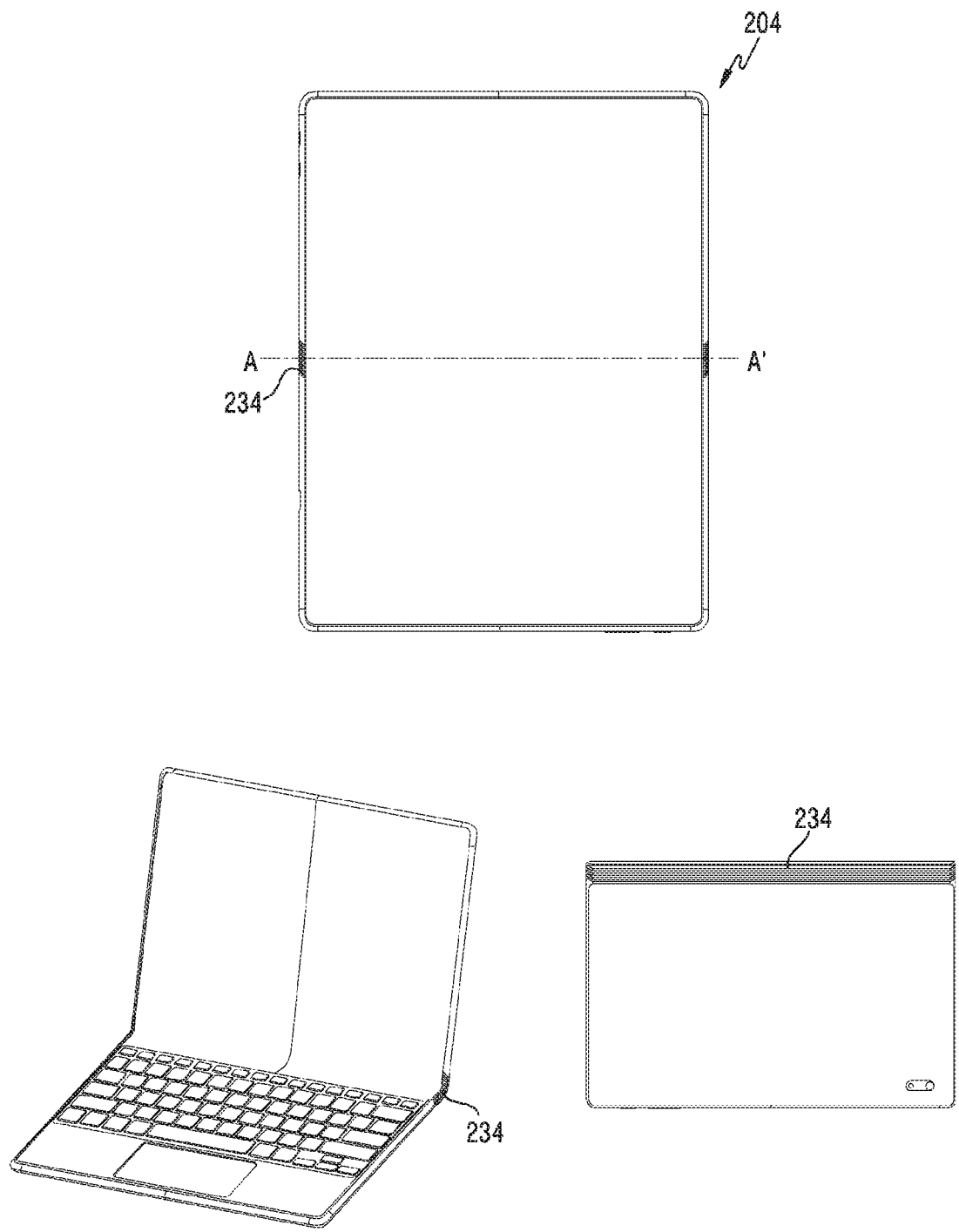
FIG. 2D is a view illustrating an electronic device, according to an embodiment.

FIG. 2A is a diagram of an electronic device, according to an embodiment. FIG. 2B is a diagram of an electronic device, according to an embodiment. FIG. 2C is a diagram of an electronic device, according to an embodiment. FIG. 2D is a diagram of an electronic device, according to an embodiment.

Referring to FIGS. 2A to 2D, an electronic device (e.g., the electronic device 101) may be a foldable electronic device, at least a portion of which may be folded. A first electronic device 201 illustrated in FIG. 2A may be a mobile terminal that may be folded with respect to a folding axis A-A' of a first direction (e.g., a transverse direction). The first electronic device 201 may be folded in a direction in which a display 261 is located (hereinafter, an in-folding scheme). The first electronic device 201 may be folded in a direction that is opposite to a direction in which a display 261 is located (hereinafter, an out-folding scheme).

A first electronic device 202 illustrated in FIG. 2B may be a tablet terminal that may be folded with respect to a folding axis B-B' of a second direction (e.g., a longitudinal direction). The second electronic device 202 may be folded in an out-folding scheme. The second electronic device 202 may be operated in a tablet environment (a tablet mode) in an unfolding state, and may be operated in a phone environment (a phone mode) in a folding state.

A third electronic device 203 illustrated in FIG. 2C may be a large-screen terminal that may be folded with respect to the folding axis B-B' of the second direction. The third electronic device 203 may be folded in an out-folding scheme. The third electronic device 203 may be operated in a tablet environment (a tablet mode) in an folding state, and may be operated in a PC environment (a PC mode or a multimedia mode) in an unfolding state.

A fourth electronic device 204 illustrated in FIG. 2D may be a large-screen terminal that may be folded with respect to the folding axis A-A' of the first direction. The fourth electronic device 204 may be folded in an in-folding scheme. The fourth electronic device 204 may be operated in a tablet environment in an unfolding state, and may be operated in a notebook environment (or a PC environment) in an intermediate folding state.

The first to fourth electronic devices 201 to 204 described above may include a multi-link cover 231, 232, 233, and 234 that connects the first body and the second body such that the first body and the second body are foldable. The multi-link cover 231, 232, 233, and 234 may include a plurality of joint parts that may be bent in oneness without a gap. The first to fourth electronic devices 201 to 204 may include at least one hinge structure, at least a portion of which is located in the interior of the multi-link cover 231, 232, 233, and 234. A detailed description of the multi-link cover 231, 232, 233, and 234 and the hinge structure will be made with reference to FIGS. 4 to 8B.

Although it has been described that the first to fourth electronic devices 201 to 204 illustrated in FIGS. 2A to 2D are in-folded or out-folded, an electronic device may be either in-folded or out-folded. Although an example in which the first to fourth electronic devices 201 to 204 illustrated in FIGS. 2A to 2D are folded with respect to one folding axis has been illustrated, an electronic device may be folded with respect to at least two folding axes.

Prior to a detailed description thereof, various embodiments of the disclosure will be described while taking the first electronic device of FIG. 2A as an example.

Figure 3A:
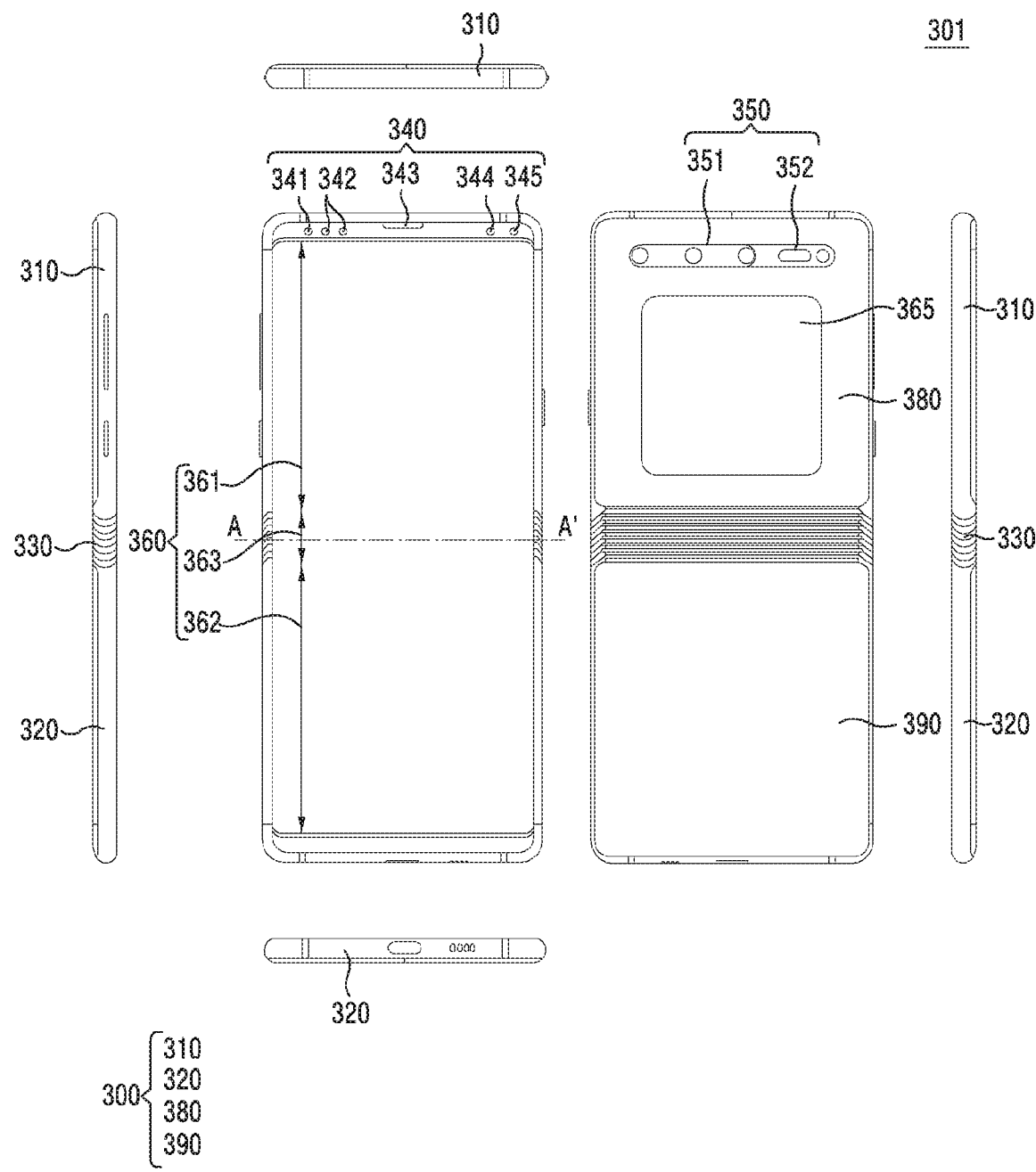
FIG. 3A is a view illustrating a flat state of an electronic device, according to an embodiment.
Figure 3B:
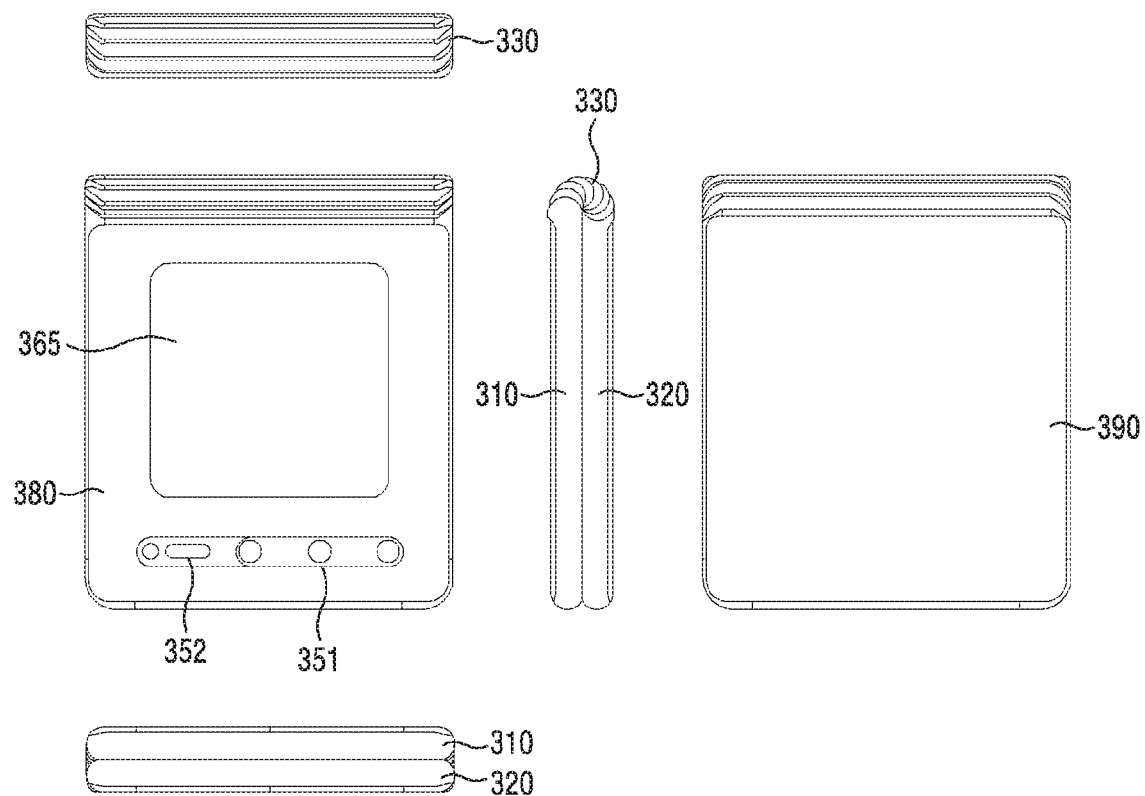
FIG. 3B is a view illustrating a folded state of the electronic device, according to an embodiment.

FIG. 3A is a diagram of a flat state of an electronic device, according to an embodiment. FIG. 3B is a diagram of a folded state of the electronic device, according to an embodiment.

Referring to FIGS. 3A and 3B, an electronic device 301 may include a housing 300, a multi-link cover 330, a flexible or foldable display 360. In the disclosure, a surface, on which the flexible display 360 is disposed, is defined as a first surface or a front surface of the electronic device 301. An opposite surface of the front surface is defined as a second surface or a rear surface of the electronic device 301. A surface that surrounds a space between the front surface and the rear surface is defined as a third surface or a side surface of the electronic device 301.

The display 360 may be disposed in a space defined by the housing 300. The display 360 may be seated on the recess defined by the housing 300, and may constitute most of the front of the electronic device 301. Accordingly, the front surface of the electronic device 301 may include a display 360, and a partial area of the first body 310 and a partial area of the second body structure 320, which are adjacent to the display 360. Further, the rear surface of the electronic device 301 may include the first rear cover 380, and a partial area of the first body 310, which is adjacent to the first rear cover 380, the second rear cover 390, and a partial area of the second body 320, which is adjacent to the second rear cover 390.

At least a partial area of the display 360 may be deformed to a flat surface or a curved surface. The display 360 may include a folding area 363, a first area 361 disposed on one side (e.g., the upper side of the folding area 363) of the folding area 363, and a second area 362 disposed on an opposite side (the lower side of the folding area 363) thereof.

The first area 361 and the second area 362 may have shapes that are symmetrical to each other with respect to the folding area 363 as a whole. The first area 361 and the second area 362 may include parts having symmetrical shapes, and parts having asymmetrical shapes.

Meanwhile, the classification of the areas of the display 360 illustrated in FIG. 3A is illustrative, and the display 360 may be classified into a plurality of areas (e.g., four or more or two) according to the structure or function of the display 230. Although an area of the display 360 may be classified by the folding area 363 or the folding axis A-A' of the first direction (e.g., the transverse (X axis) direction of FIG. 3A) as an example, an area of the display 360 may be classified with respect to the folding area or the folding axis of the second direction (e.g., the longitudinal (Y axis) direction).

The housing 300 may include a first body 310, a second body 320, a first rear cover 380, and a second rear cover 390. The foldable housing 300 of the electronic device 301 is not limited to the shape and coupling state illustrated in FIGS. 3A and 3B, and may be realized through another shape or another combination and/or coupling of components. The first body 310 and the first rear cover 380 may be integrally formed, and the second body 320 and the second rear cover 390 may be integrally formed.

The first body 310 and the second body 320 may be disposed on opposite sides of the folding axis A-A', and may have shapes that are symmetrical to each other with respect to the folding axis A-A' as a whole.

An angle or a distance between the first body 310 and the second body 320 may be different according to whether the state of the electronic device 301 is a flat state, a folded state, or an intermediate state.

When the electronic device 301 is in a flat state (e.g., FIG. 3A), the first body 310 and the second body 320 may be disposed to face the same direction while defining an angle of 180 degrees therebetween. A surface of the first area 361, a surface of the folding area 363, and a surface of the second area 362 of the display 360 may define 180 degrees therebetween, and may face the same direction (e.g., the forward direction of the electronic device).

When the electronic device 301 is in the folded state (e.g., FIG. 3B), the first body 310 and the second body 320 may be disposed to face each other. A surface of the first area 361 and a surface of the second area 362 of the display 360 may face each other. At least a portion of the folding area 363 may be curved to be a curved surface having a predetermined curvature.

When the electronic device 301 is in the intermediate state, the first body 310 and the second body 320 may be disposed with a certain angle. The surface of the first area 361 and the surface of the second area 362 of the display 360 may define an angle that is larger than that of the folded state and smaller than that of the flat state. At least a portion of the folding area 363 may be a curved surface having a predetermined curvature, and the curvature then may be smaller than in the folding state.

The first body 310 and the second body 320 may include a recess that accommodates the display 360. At least a portion of the first body 310 and the second body 320 may be formed of a metallic material or a nonmetallic material having a selected strength to support the display 360.

The first body 310 may include a component-mounting area 340 in which various components are disposed. The component-mounting area 340 may include a light emitting diode 341, an illumination sensor 342, a receiver 343, a front camera 344, and a proximity sensor 345. At least some of various embodiments may be included in a partial area of the second body 320.

The component-mounting area 340 may be hidden by the display 360 or the first body 310 that is slid during a folding operation. A detailed description of a sliding structure of the display 360 or the first body 310 will be made below with reference to FIGS. 9A to 12B.

The multi-link cover 330 may be disposed between the first body 310 and the second body 320, and may hide at least some of internal components (e.g., a hinge structure) that may maintain the first body 310 and the second body 320 in various states (e.g., a flat state, a folded state, or an intermediate state). The first body 310 and the second body 320 may be connected to each other to have oneness. The multi-link cover 330 may include a plurality of joint parts to realize a zero gap regardless of the state of the electronic device 301, and thus may be configured such that the first body 310 and the second body 320 are viewed as if they were integral.

The first rear cover 380 may be disposed on a rear surface of the first body 310, and may have a substantially rectangular periphery, and the periphery may be surrounded by the first body 310. Similarly, the second rear cover 390 may be disposed on a rear surface of the second body 320, and the periphery thereof may be surrounded by the second body 320.

The first rear cover 380 and the second rear cover 390 may have shapes that are substantially symmetrical to each other with respect to the folding axis (A-A'). However, the first rear cover 380 and the second rear cover 390 do not necessarily have mutually symmetrical shapes, and the electronic device 301 may include a first rear cover 380 and a second rear cover 390 of various shapes. The first rear cover 380 may be integrally formed with the first body 310, and the second rear cover 390 may be integrally formed with the second body 320.

The rear cover 380, the second rear cover 390, the first body 310, and the second body 320 may define spaces, in which various components (e.g., a printed circuit board or a battery) of the electronic device 301 may be disposed. One or more components may be disposed on the rear surface of the electronic device 301 or may be visually exposed. At least a portion of the sub-display 365 may be visually exposed through a first rear surface area of the first rear cover 380, and one or more components or sensors 350 may be visually exposed through a second rear surface area of the second rear cover 380. The one or more components or sensors 350 may include a rear camera 351 and/or a proximity sensor 352.

Figure 3C:
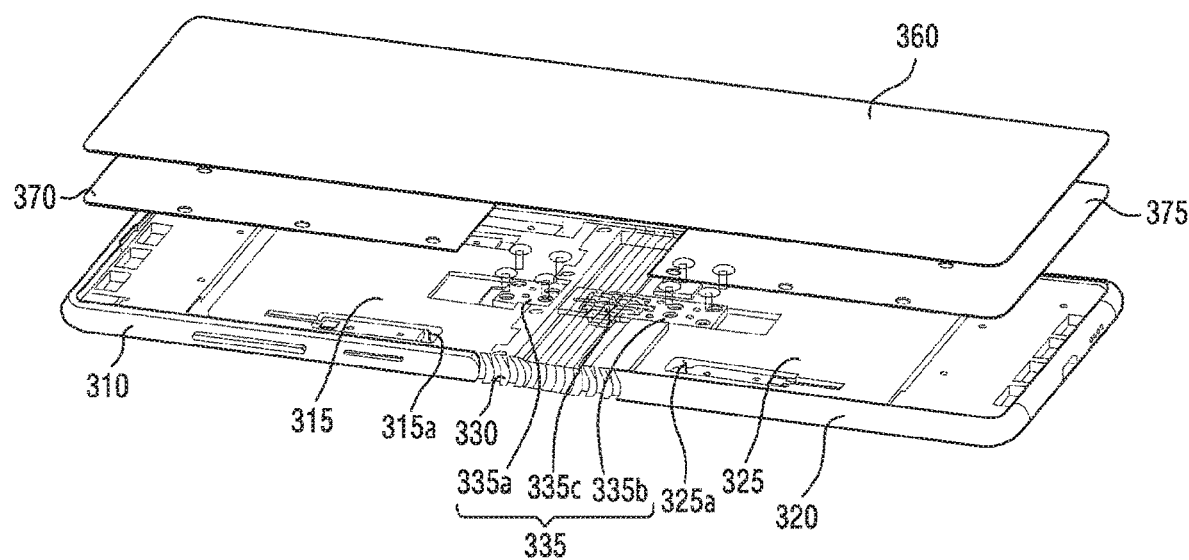
FIG. 3C is an exploded perspective view of a configuration of an electronic device, according to an embodiment.
Figure 3D:
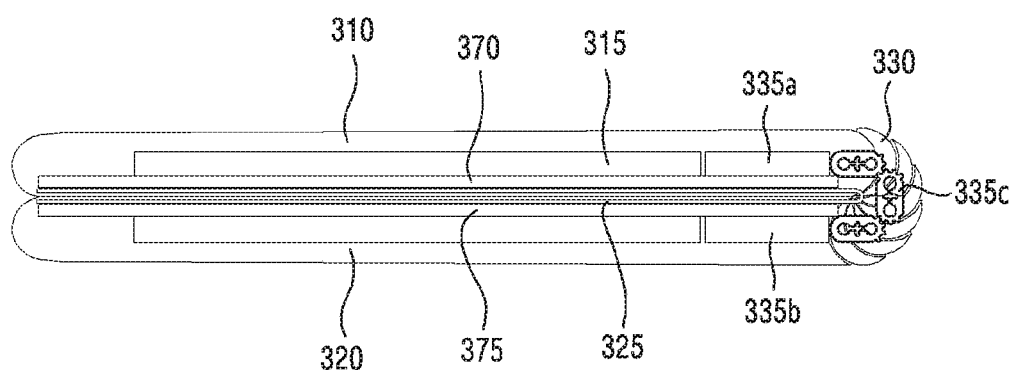
FIG. 3D is a cross-sectional view of a folding state of an electronic device, according to an embodiment.

FIG. 3C is a diagram of a configuration of an electronic device, according to an embodiment. FIG. 3D is a diagram of a folding state of an electronic device, according to an embodiment.

Referring to FIGS. 3C and 3D, an electronic device 301 may include a display 360, a first bracket 370, a second bracket 375, a first body 310, a second body 320, a first slide structure 315, a second slide structure 325, a multi-link cover 330, and a hinge structure 335.

Prior to a detailed description thereof, in order to avoid a repeated description, a description of the first body 310, the second body 320, and the display 360 will be omitted.

The first bracket 370 may be disposed between the first area 361 of the display 360 and the first body 310, and may support the first area 361 of the display 360. The first bracket 370 may be coupled to the first slide structure 315.

The second bracket 375 may be disposed between the second area 362 of the display 360 and the second body 320, and may support the second area 362 of the display 360. The second bracket 370 may be coupled to the second slide structure 325.

The first slide structure 315 may be disposed between the first bracket 370 and the first body 310, and may be coupled to the first body 310 to be slid in a predetermined range 315a in the second direction (e.g., the longitudinal axis (Y axis) or the direction that is perpendicular to the folding axis). The second slide structure 325 may be disposed between the second bracket 375 and the second body 320, and may be coupled to the second body 320 to be slid in a predetermined range 325a in the second direction (e.g., the longitudinal axis (Y axis)). The ranges 315a and 325a may be determined in consideration of a difference of the lengths of the electronic device 301 in the folding state and the unfolding state. In the unfolding state, as illustrated in FIG. 3C, spacing distances of the predetermined ranges 315a and 325a may be provided in the second direction between the first body 310 and the second body 320, and the first slide structure 315 and the second slide structure 325. Meanwhile, in the folding state, as illustrated in FIG. 3D, there may be no spacing distance between the first body 310 and the second body 320, and the first slide structure 315 and the second slide structure 325.

One side of the multi-link cover 330 may be connected to the first slide structure 315, and an opposite side of the multi-link cover 330 may be connected to the second slide structure 325.

At least a partial area of the hinge structure 335 may be located in the interior of the multi-link cover 330, one side of the hinge structure 335 may be connected to the first slide structure 315, and an opposite side of the hinge structure 335 may be connected to the second slide structure 325. The hinge structure 335 may include a first hinge bridge 335a coupled (e.g., screw-coupled) to the first slide structure 315, a second hinge bridge 335b coupled to the second slide structure 325, and a gear hinge 335c located between the first hinge bridge 335a and the second hinge bridge 335b. A detailed structure of the multi-link cover 330 will be described with reference to FIGS. 4 to 6, and a detailed structure of the gear hinge 335c will be described with reference to FIGS. 7 to 8B.

The electronic device 301 may include two or more hinge structures 335.

The electronic device 10 may further include a substrate part, on which various components for realizing various functions of the electronic device 10 are mounted, and a battery for supplying electric power. The substrate part may include a first substrate disposed in the first body 310, and a second substrate disposed in the second body 320.

Figure 4:
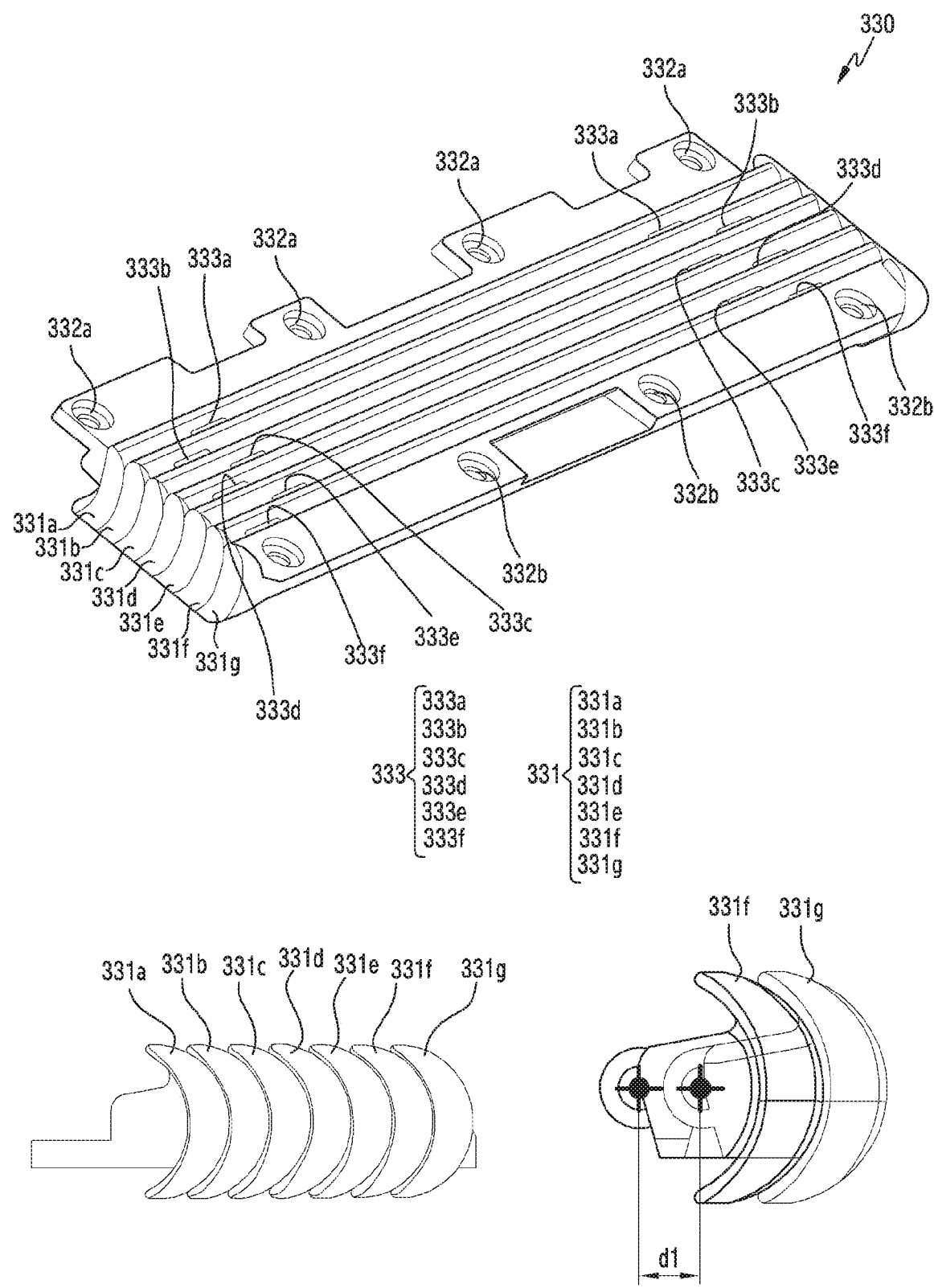
FIG. 4 is a view illustrating a flat state of a multi-link cover, according to an embodiment.
Figure 5:
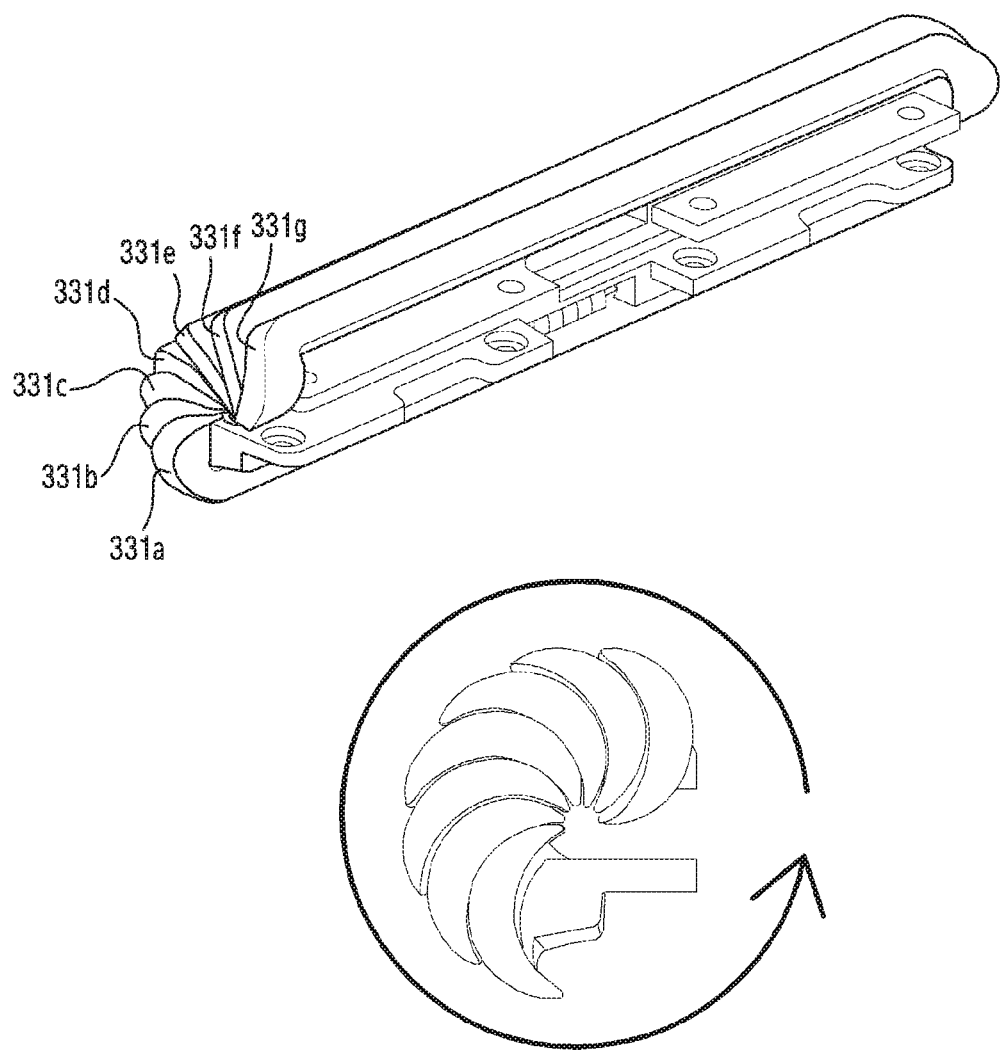
FIG. 5 is a view illustrating a folded state of a multi-link cover, according to an embodiment.
Figure 6:
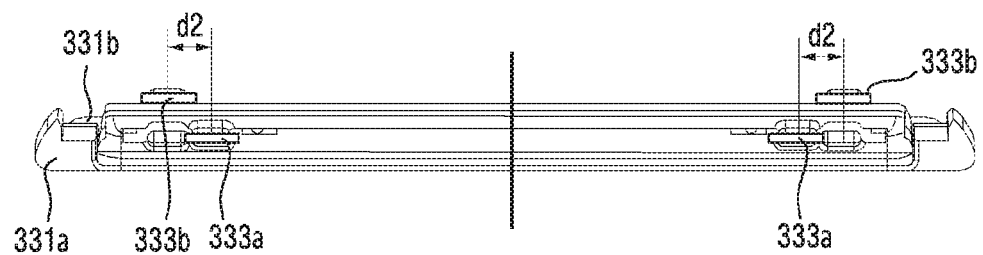
FIG. 6 is a cross-sectional view taken along line B-B' of FIG. 4, according to an embodiment.

FIG. 4 is a diagram of a flat state of a multi-link cover, according to an embodiment. FIG. 5 is a diagram of a folded state of a multi-link cover, according to an embodiment. FIG. 6 is a diagram of a view taken along line B-B' of FIG. 4, according to an embodiment.

Referring to FIGS. 4 to 6, a multi-link cover 330 may include a plurality of joint parts 331 connected to each other to pivot with respect to each other. The multi-link cover 330, as illustrated in FIG. 5, may pivot (e.g., by 180 degrees).

The joint parts 331 may be connected to each other by shafts 333 that cross each other. One side of the first joint part 331a may be connected to the first slide structure 315 by at least one first coupling unit 332a (e.g., a screw hole), one side of the second joint part 331b may be connected to an opposite side of the first joint part 331a to pivot around a first shaft 333a, one side of the third joint part 331c may be connected to an opposite side of the first joint part 331a to pivot around a second shaft 333b, one side of the fourth joint part 331d may be connected to an opposite side of the first joint part 331a to pivot around a third shaft 333c, one side of the fifth joint part 331e may be connected to an opposite side of the fourth joint part 331d to pivot around a fourth shaft 333d, one side of the sixth joint part 331f may be connected to an opposite side of the first joint part 331a to pivot around a fifth shaft 333e, one side of the seventh joint part 331g may be connected to an opposite side of the first joint part 331a to pivot around a sixth shaft 333f, and the seventh joint part 331g may be connected to the second slide structure 325 by at least one second coupling unit 332b (e.g., a screw hole).

The first to sixth shafts 333a to 333f may cross each other. The second shaft 333b, the fourth shaft 333d, and the sixth shaft 333f, as illustrated in FIG. 6, may be spaced transversely apart from the first shaft 333a by a predetermined distance d2, the third shaft 333c, and the fifth shaft 333e, respectively, to cross each other. The distance d1 between the joint parts 331 may be minimized by disposing the first to sixth shafts 333a to 333f such that the first to sixth shafts 333a to 333f cross each other.

The multi-link cover 330, as illustrated in FIGS. 4 and 5, hardly have gaps between the joint parts in the flat state and the folded state, and may have a thickness that is the same as (substantially the same as or similar to) the first body 310 and the second body 320. The multi-link cover 330 may provide an external appearance that has oneness with the first body 310 and the second body 320.

Meanwhile, although FIGS. 4 to 6 illustrate that the multi-link cover 330 includes seven joint parts, this is a simple example and does not limit the embodiments of the disclosure.

Figure 7:
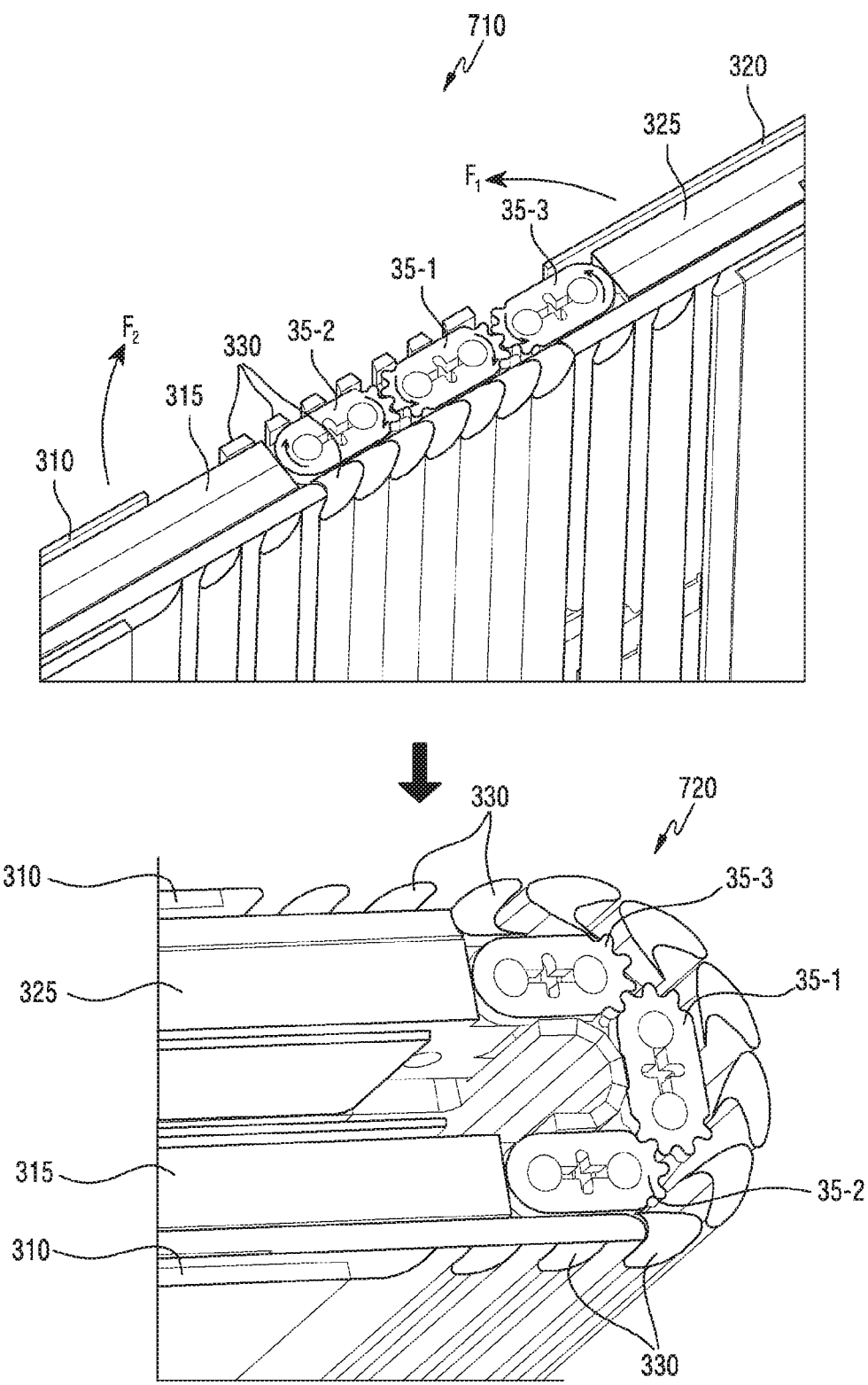
FIG. 7 is a cross-sectional view illustrating a folding portion of an electronic device, according to an embodiment.
Figure 8A:
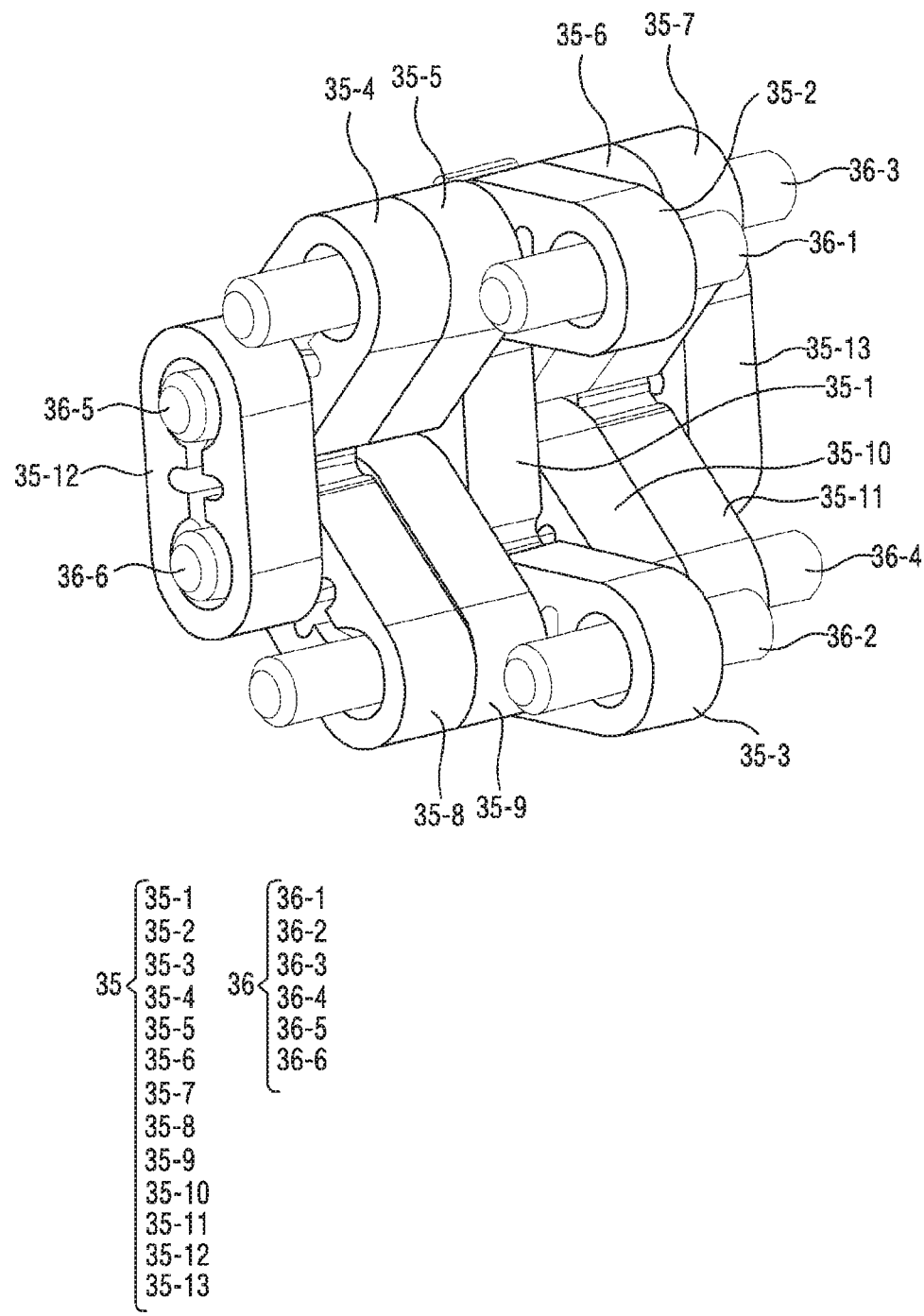
FIG. 8A is a view illustrating a gear hinge, according to an embodiment.
Figure 8B:
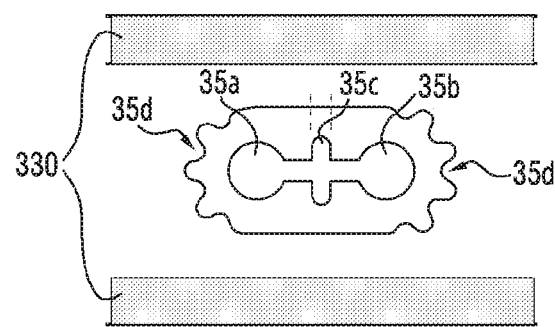
FIG. 8B is a view illustrating a gear block that includes a gear hinge, according to an embodiment.

FIG. 7 is a diagram of a folding portion of an electronic device, according to an embodiment. FIG. 8A is a diagram of a gear hinge, according to an embodiment. FIG. 8B is a diagram of a gear block that includes a gear hinge, according to an embodiment.

Referring to FIGS. 7 to 8B, an electronic device 301 may include a gear hinge 335c between the first body 310 and the second body 320. The gear hinge 335c may be disposed in the interior of the multi-link cover 330.

The gear hinge 335c may allow the first body 310 and the second body 320 to interwork with each other when the electronic device 301 is folded or unfolded by an external force. When an external force is applied to the second body 320 in the first direction F, as illustrated in the drawings by reference numeral 710, a third gear block 35-3 pivots, and the pivoting of the third gear block 35-3 is delivered to a second gear block 35-2 through a first gear block 35-1 to pivot the first body 310 in the second direction F2, and the first body 310 and the second body 320 may be folded as illustrated in the drawing by reference numeral 720. Similarly, when the first body 310 pivots in the second direction F2 by an external force, the second body 320 may pivot in the first direction F1 by the first to third gear blocks 35-1, 35-2, and 35-3.

The gear hinge 335c may provide a free stop function for freely adjusting an angle (hereinafter, a folding angle) between the first body 310 and the second body 320. The gear hinge 335c may include a plurality of gear blocks 35. The gear hinge 335c, as illustrated in FIG. 8A, may include thirteen elliptical gear blocks. However, this is a simple example, and does not limit the embodiments of the disclosure. The gear hinge 335c may include three or more gear blocks.

The gear blocks 35, as illustrated in FIG. 8B, may include a first hole 35a formed (or disposed) at an end of one side of an elliptical body and into which one of the plurality of shafts 36 is inserted, a second hole 35b formed (or disposed) at an end of an opposite side of the body and into which another one of the plurality of shafts 36 is inserted, and a tension hole 35c.

The tension hole 35c is formed between the first hole 35a and the second hole 35b, and can prevent wear between the first hole 35a and the shaft inserted into the first hole 35a due to the folding or unfolding of the electronic device 301 and wear between the second hole 35b and the shaft inserted into the second hole 35b.

Some of the gear blocks 35 may include at least one sawtooth structure 35d. The first gear block 35-1 may include sawtooth structures 35d on opposite sides thereof, each of the second to eleventh gear blocks 35-2, 35-3, 35-4, 35-5, 35-6, 35-7, 35-8, 35-9, 35-10, and 35-11 includes a sawtooth structure 35d on one side thereof, and the twelfth and thirteenth gear blocks 35-12 and 35-13 may not include a sawtooth structure.

The plurality of shafts 36, as illustrated in FIG. 8A, may pivotally connect one or more gear blocks. The first shaft 36-1 may be inserted into (e.g., interference-fitted with) a first hole 35-2a of the second gear block 35-2, and may be connected to the first hinge bridge 335a. Similarly, the second shaft 36-2 may be inserted into a first hole 35-3a of the third gear block 35-3, and may be connected to the second hinge bridge 335b.

The third shaft 36-3 may be inserted into a first hole 35-4a of the fourth gear block 35-4, a first hole 35-5a of the fifth gear block 35-5, a second hole 35-4b of the second gear block 35-2, a first hole 35-6a of the sixth gear block 35-6, and a first hole 35-7a of the seventh gear block 35-7.

The fourth shaft 36-4 may be inserted into a first hole 35-8a of the eighth gear block 35-8, a first hole 35-9a of the ninth gear block 35-9, a second hole 35-3b of the third gear block 35-3, a first hole 35-10a of the tenth gear block 35-10, and a first hole 35-11a of the eleventh gear block 35-11.

The fifth shaft 36-5 may be inserted into a first hole 35-12a of the twelfth gear block 35-12, a second hole 35-4b of the fourth gear block 35-4, a second hole 35-5b of the fifth gear block 35-5, a first hole 35-1a of the first gear block 35-1, a second hole 35-6b of the sixth gear block 35-6, a second hole 35-7b of the seventh gear block 35-7, and a first hole 35-13a of the thirteenth gear block 35-13.

The sixth shaft 36-6 may be inserted into a second hole 35-12b of the twelfth gear block 35-12, a second hole 35-8b of the eighth gear block 35-8, a second hole 35-9b of the ninth gear block 35-9, a second hole 35-1b of the first gear block 35-1, a second hole 35-10b of the tenth gear block 35-10, a second hole 35-11b of the eleventh gear block 35-11, and a second hole 35-13b of the thirteenth gear block 35-13.

The gear hinge 335c may maintain the folding angle by the frictional force between the shafts 36 and the gear blocks 35 and the frictional force between the gear blocks 35 until a force of a predetermined magnitude or more is applied. Through this, the folding angle of the electronic device 301 may be freely adjusted.

Figure 9:
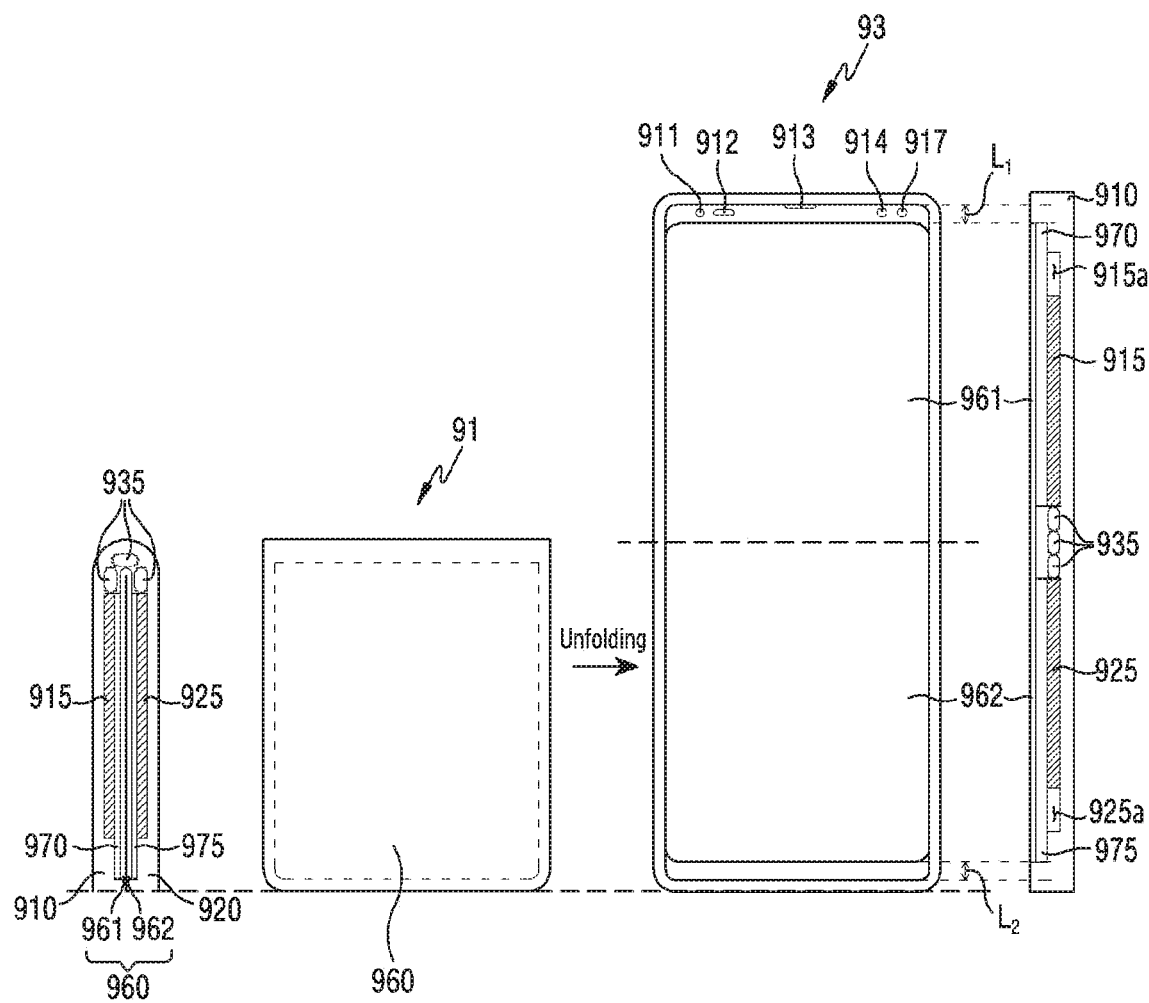
FIG. 9 is a view illustrating an example in which a display is slid when a foldable electronic device is folded or unfolded in an in-folding scheme, according to an embodiment.

FIG. 9 is a diagram of an example in which a display is slid when a foldable electronic device is folded or unfolded in an in-folding scheme, according to an embodiment.

Referring to FIG. 9, a foldable electronic device (e.g., the electronic device 101, the first electronic device 201, the fourth electronic device 204, and the electronic device 301) in an in-folding scheme may include a display 960 that is slid when the foldable electronic device is folded or unfolded.

A first bracket 970 that supports a first area 961 of the display 960 may be coupled to a first slide structure 915 slidably coupled to the first body 910. A second bracket 975 that supports a second area 962 of the display 960 may be coupled to a second slide structure slidably coupled to the second body 920.

When the electronic device is in a folding state, opposite ends of the display 960 may be located close to ends of the first body 910 and the second body 920 as illustrated in the drawings by reference numeral 91. When the electronic device is in an unfolding state, opposite ends of the display 960 may be located to be spaced apart from ends of the first body 910 and the second body 920 by predetermined distances L1 and L2 as illustrated in the drawings by reference numeral 93. As the first slide module 915 is moved, a first space 915a may be defined between the first slide module 915 and the first body 910. As the second slide module 925 is moved, a second space 925a may be defined between the second slide module 925 and the second body 920.

If the electronic device is unfolded, an upper end area of the first body 910 may be exposed as the display 960 is slid. Various sensors or electronic components may be disposed at the upper end area. A light emitting diode 911, an illumination sensor 912, a receiver 913, a camera 914, a proximity sensor 917, and the like may be disposed in the upper end area. This is a simple example and does not limit an embodiment of the disclosure, and other sensors or electronic components may be added or some sensors or electronic components may be omitted.

Figure 10A:
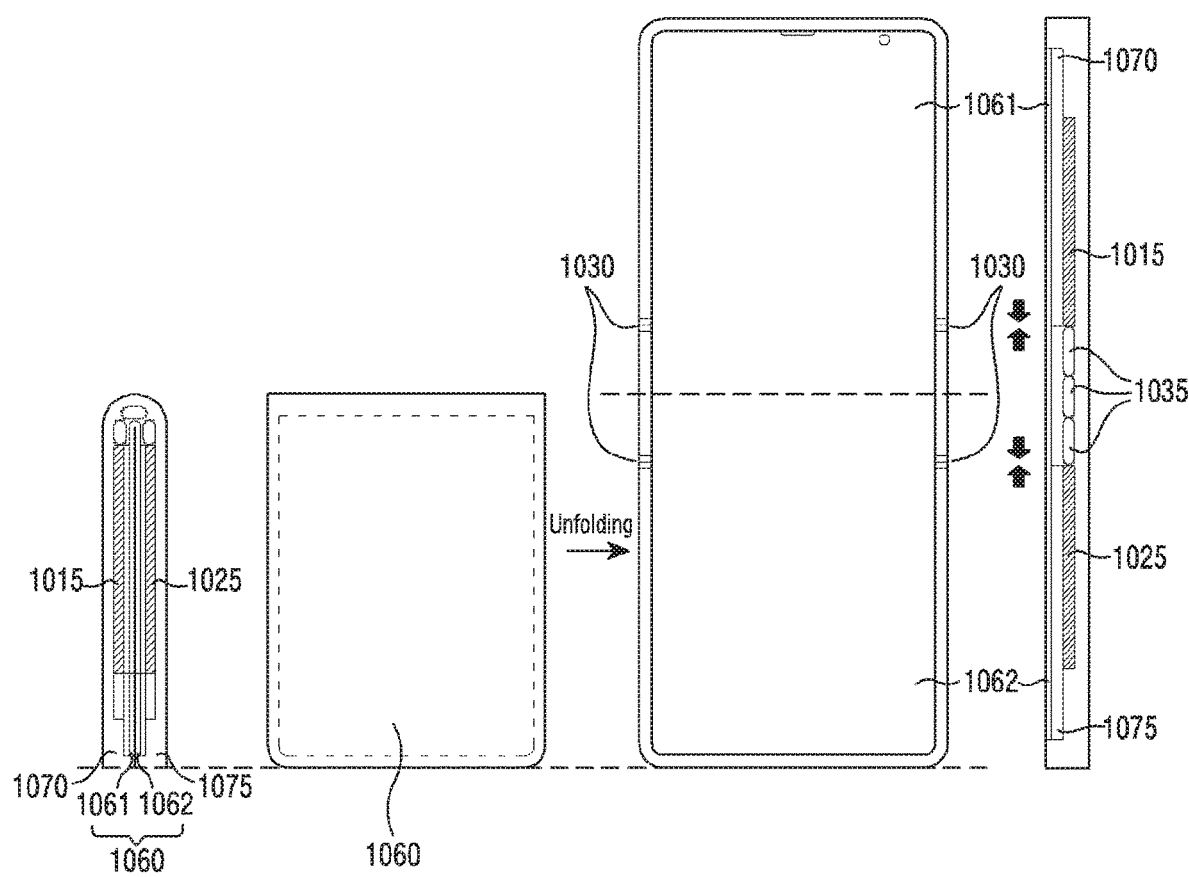
FIG. 10A is a view illustrating an example in which the size of a housing is adjusted when a foldable electronic device is folded or unfolded in an in-folding scheme, according to an embodiment.
Figure 10B:
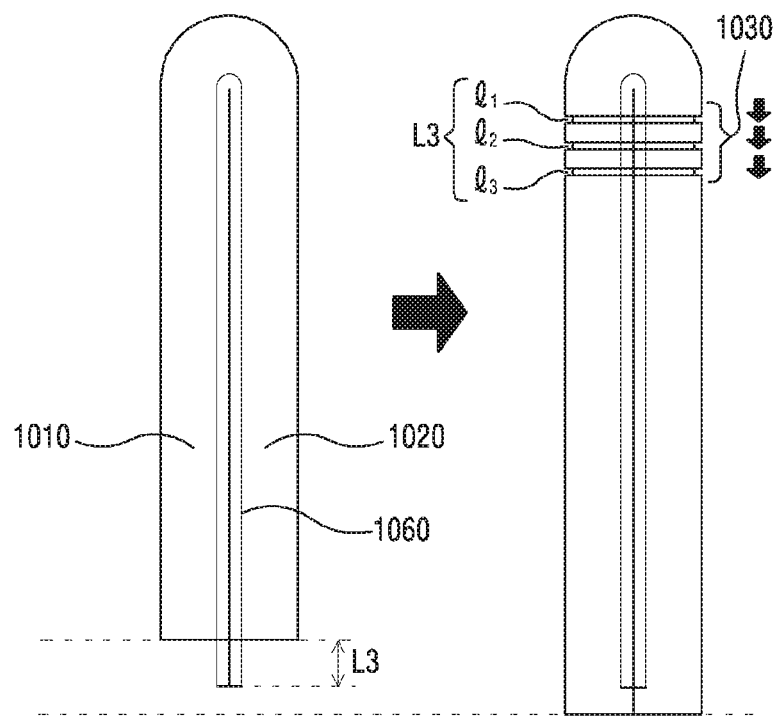
FIG. 10B is a view illustrating an example in which the size of a housing is adjusted when a foldable electronic device is folded or unfolded in an in-folding scheme, according to an embodiment.

FIG. 10A is a diagram of an example in which the size of a housing is adjusted when a foldable electronic device is folded or unfolded in an in-folding scheme, according to an embodiment. FIG. 10B is a diagram of an example in which the size of a housing is adjusted when a foldable electronic device is folded or unfolded in an in-folding scheme, according to an embodiment.

Referring to FIGS. 10A and 10B, the entire size of a foldable electronic device in an in-folding scheme may be changed when the foldable electronic device is folded or unfolded.

A first bracket 1070 that supports a first area 1061 of the display 1060 may be coupled to the first body 1010, and a second bracket 1075 that supports a second area 1062 of the display 1060 may be coupled to the second body 920. In this way, the display 1060 may be fixed to the first body 1010 and the second body 1030. The multi-link cover 1030 may be connected to the first body 1010 and the second body 1020, and the hinge structure 1035 may be connected to a first slide structure 1015 slidably coupled to the first body 1010 and a second slide structure 1025 slidably coupled to the second body 1020.

In the folding state and the unfolding state of the electronic device, opposite ends of the display 1060 may be located at locations that are similar to the locations of the first body 1010 and the second body 1020. As illustrated in FIG. 10A, when the electronic device is converted from the folding state to the unfolding state, the intervals between the plurality of joint parts that constitute the multi-link cover 1030 is reduced (contracted) whereby the opposite ends of the display 1060 may be located at locations that are similar to the locations of the ends of the first body 1010 and the second body 1020 in the unfolding state. Further, as illustrated in FIG. 10B, when the electronic device is converted from the unfolding state to the folding state, the intervals between the plurality of joint parts that constitute the multi-link cover 1030 is increased (expanded) whereby the opposite ends of the display 1060 may be located at locations that are similar to the locations of the ends of the first body 1010 and the second body 1020 in the folding state. The sum of the intervals l1, l2, and l3 of the plurality of joint parts may be the same as (substantially the same as or similar to) the length L3, by which the display 1060 may be exposed to the outside when the electronic device is folded.

In FIGS. 10A and 10B, it has been illustrated and described that the intervals l1, l2, and l3 of the plurality of joints parts that constitute the multi-link cover 1030 are adjusted. However, in the electronic device, a multi-joint part is disposed in at least one of the first body 1010 or the second body 1020, the interval of the multi-joint part disposed in at least one of the first body 1010 or the second body 1020 is increased or decreased when the electronic device is folded or unfolded.

Figure 11A:
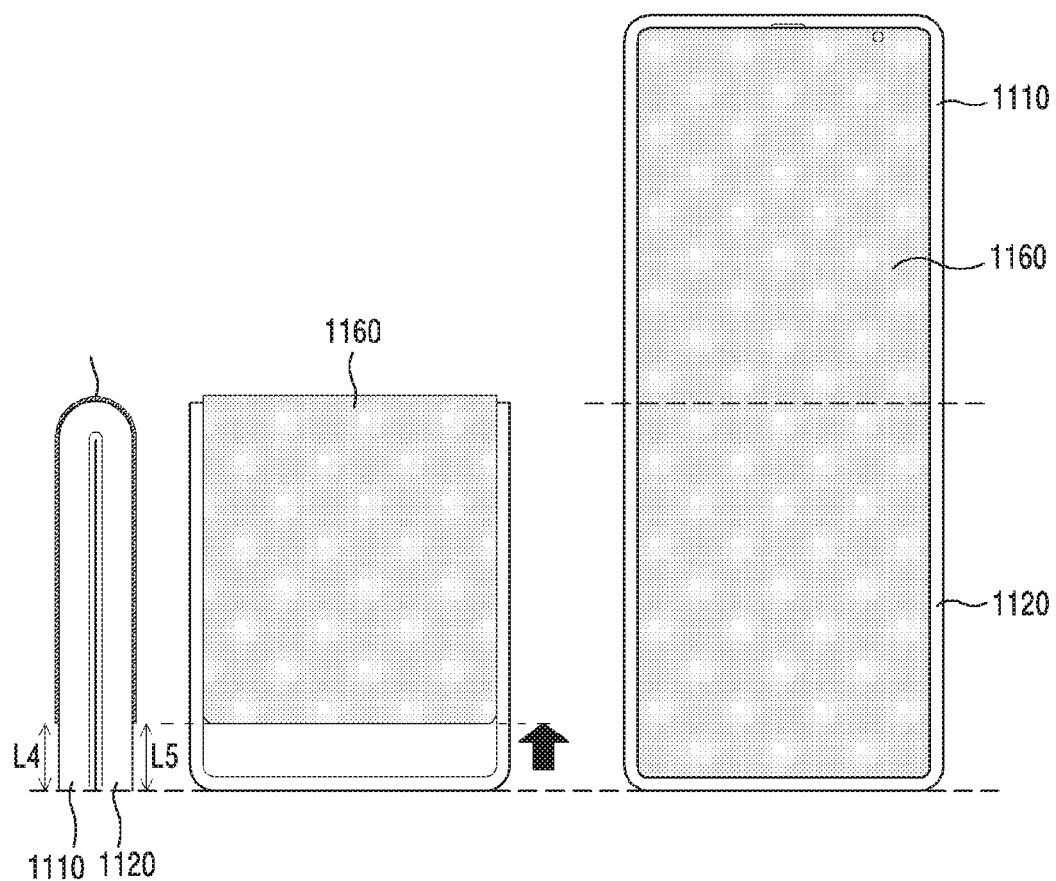
FIG. 11A is a view illustrating an example in which a display is slid when a foldable electronic device is folded or unfolded in an out-folding scheme, according to an embodiment.
Figure 11B:
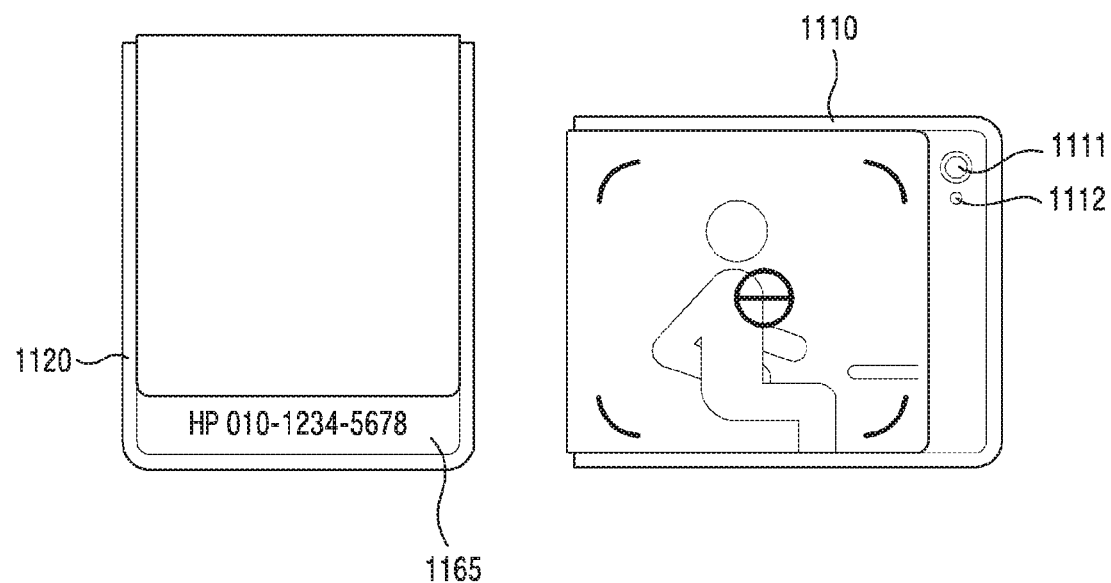
FIG. 11B is a view illustrating an example in which a display is slid when a foldable electronic device is folded or unfolded in an out-folding scheme, according to an embodiment.

FIG. 11A is a diagram of an example in which a display is slid when a foldable electronic device is folded or unfolded in an out-folding scheme, according to an embodiment. FIG. 11B is a diagram of an example in which a display is slid when a foldable electronic device is folded or unfolded in an out-folding scheme, according to an embodiment.

Referring to FIGS. 1A and 11B, the display 1160 of a foldable electronic device in an out-folding scheme may be slid when the foldable electronic device is folded or unfolded.

The electronic device may have a structure that is similar to the electronic device of FIG. 9. However, due to the out-folding scheme, in the electronic device, opposite ends of the display 1160 may be located at locations that are similar to the locations of the ends of the first body 1110 and the second body 1120 in the unfolding state, and opposite ends of the display 1160 may be located to be spaced apart from the ends of the first body 1110 and the second body 1120 by predetermined distances L4 and L5 in the folding state.

The electronic device may include various sensors or electronic components in a partial area of the first body 1110 or the second body 1120 exposed due to slide of the display 1160 during a folding operation. The electronic device, as illustrated in FIG. 11B, may include a camera 1111 or a proximity sensor 1112 in a partial area of the first body 1110, and may include an auxiliary display 1165 in a partial area of the second body 1120. This is a simple example and does not limit an embodiment of the disclosure, and other sensors or electronic components may be added or some sensors or electronic components may be omitted.

Figure 12A:
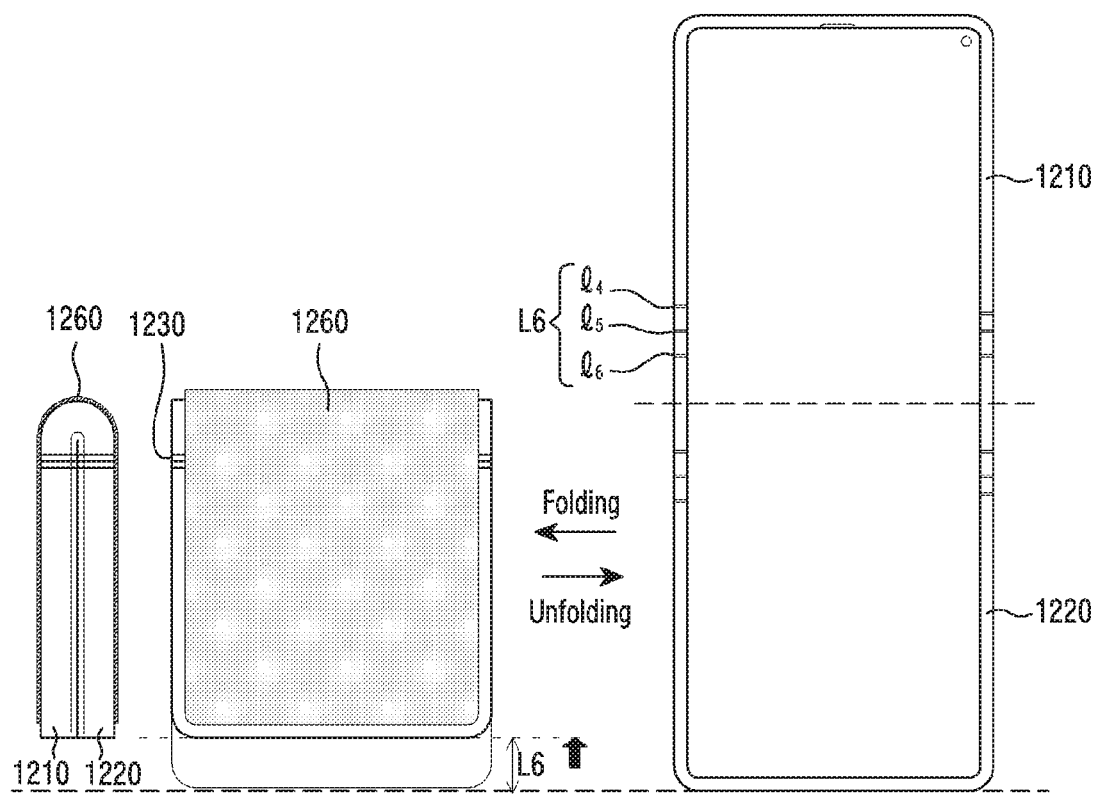
FIG. 12A is a view illustrating an example in which the size of a housing is adjusted when a foldable electronic device is folded or unfolded in an out-folding scheme, according to an embodiment.
Figure 12B:
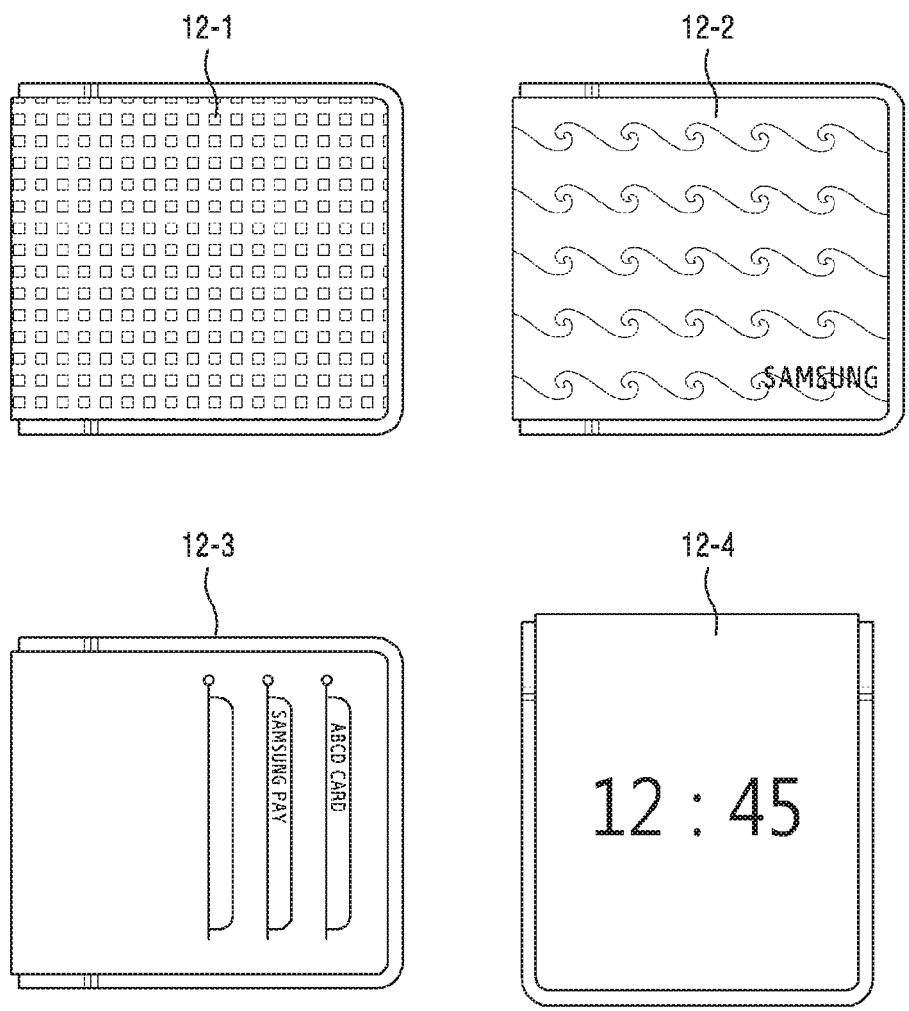
FIG. 12B is a view illustrating an example in which the size of a housing is adjusted when a foldable electronic device is folded or unfolded in an out-folding scheme, according to an embodiment.

FIG. 12A is a diagram of an example in which the size of a housing is adjusted when a foldable electronic device is folded or unfolded in an out-folding scheme, according to an embodiment. FIG. 12B is a diagram of an example in which the size of a housing is adjusted when a foldable electronic device is folded or unfolded in an out-folding scheme, according to an embodiment.

Referring to FIGS. 12A and 12B, the sizes of the first body 1210 and the second body 1220 of a foldable electronic device in an out-folding scheme may be adjusted when the foldable electronic device is folded or unfolded.

The electronic device may have a structure that is similar to the electronic device of FIGS. 10A and 10B. However, as illustrated in FIG. 12A, when the electronic device is converted from the unfolding state to the folding state, the intervals l4, l5, and l6 between the plurality of joint parts that constitute the multi-link cover 1230 is decreased by a predetermined size L6 whereby the opposite ends of the display 1260 may be located at locations that are similar to the locations of the ends of the first body 1210 and the second body 1220 in the folding state. Further, when the electronic device is converted from the folding state to the unfolding state, the intervals 14, 15, and 16 of the joint parts are increased whereby opposite ends of the display 1260 are located at locations that are similar to the locations of the ends of the first body 1210 and the second body 1220 even in the unfolding state.

In the electronic device, various digital skins may be provided in at least a partial area (e.g., the first area or the second area) of the display 1260 exposed to the outside in the folding state. The electronic device, as illustrated in FIG. 12B, various digital skins such as a pattern 12-1, a brand logo 12-2, a purse 12-3, or a watch 12-4 may be provided.

In FIGS. 12A and 12B, it has been illustrated and described that the intervals 14, 15, and 16 of the plurality of joints parts that constitute the multi-link cover 1130 are adjusted. However, in the electronic device, a multi-joint part is disposed in at least one of the first body 1110 or the second body 1120, the interval of the multi-joint part disposed in at least one of the first body 1210 or the second body 1220 is increased or decreased when the electronic device is folded or unfolded.

It has been described that ends of the multi-link cover and the hinge structure of the electronic device may pivot with respect to the opposite ends thereof by 180 degrees in an in-folding or out-folding scheme. However, in the electronic, both the in-folding and out-folding schemes may be possible. The ends of the multi-link cover and the hinge structure of the electronic device may pivot with respect to the opposite ends thereof by 360 degrees.

According to an embodiment, an electronic device may include a housing including a first body and a second body, a flexible display disposed such that at least a portion of the flexible display is exposed through a first surface of the housing, a multi-link cover connected to the first body and the second body, and including a plurality of joint parts connected to pivot with respect to each other, and at least one hinge structure, at least a portion of which is located in the interior of the multi-link cover and folably connecting the first body and the second body, the multi-link cover may have a height that is substantially the same as the heights of the first body and the second body, and the plurality of joint parts may be connected to each other by shafts disposed to cross each other.

The electronic device may further include a first slide structure slidably coupled to the first body, and a second slide structure slidably coupled to the second body.

The at least one hinge structure may include a first hinge bridge connected to the first slide structure, a second hinge bridge connected to the second slide structure, and a gear hinge connected to the first hinge bridge and the second hinge bridge.

The gear hinge may include a plurality of gear blocks and a plurality of shafts, each of the shafts may be connected to some of the plurality of gear blocks, and the plurality of gear blocks may pivot with respect to each other through the shafts.

Each of the gear blocks may include an elliptical body, a first hole disposed at an end of the body and into which a first shaft of the plurality of shafts is inserted, a second hole disposed at an opposite end of the body and into which a second shaft of the plurality of shafts is inserted, and a tension hole disposed between the first hole and the second hole, and configured to prevent wear between the first shaft and the first hole and wear between the second shaft and the second hole due to folding or unfolding of the electronic device.

The gear hinge may be configured to maintain a predetermined angle defined by the first body and the second body due to a frictional force between the first hole and the first shaft, a frictional force between the second hole and the second shaft, and a frictional force between the gear blocks.

At least some of the plurality of gear blocks may include a gear structure that allows the first body and the second body to pivot with respect to each other as the first body and the second body interwork with each other.

The electronic device may further include a first bracket configured to support a first area of the display and connected to the first slide structure, and a second bracket configured to support a second area of the display and connected to the second slide structure, and the display is slid as the electronic device may be folded or unfolded.

The electronic device may further include at least one electronic component disposed in a partial area of the first body and the second body exposed to the outside sliding of the display when the electronic device is folded or unfolded.

The electronic device may further include a first bracket configured to support a first area of the display and coupled to the first body, and a second bracket configured to support a second area of the display and coupled to the second body.

An interval of multi-joint parts disposed in at least one of the first body or the second body may become larger or smaller as the electronic device is folded or unfolded.

An interval between a plurality of joint parts that constitute the multi-link cover may become larger or smaller in correspondence to slide of at least one of the first body or the second body.

Ends of the multi-link cover and the hinge structure may pivot with respect to opposite ends of the multi-link cover and the hinge structure by 180 degrees or by 360 degrees.

According to an embodiment, an electronic device may include a housing and a second body, a flexible display disposed such that at least a portion of the flexible display is exposed through a first surface of the housing, a first slide structure slidably coupled to the first body, a second slide structure slidably coupled to the second body, a multi-link cover connected to the first body and the second body, and including a plurality of joint parts connected to pivot with respect to each other, and at least one hinge structure, at least a portion of which is located in the interior of the multi-link cover, connected to the first slide structure and the second slide structure, and foldably connecting the first body and the second body, the multi-link cover may have a height that is substantially the same as the heights of the first body and the second body, and the plurality of joint parts may be connected to each other by shafts disposed to cross each other.

The hinge structure may include a plurality of gear blocks and a plurality of shafts, and each of the shafts may be rotatably connected to some of the plurality of gear blocks.

Each of the gear blocks may include an elliptical body, a first hole disposed at an end of the body and into which a first shaft of the plurality of shafts is inserted, a second hole disposed at an opposite end of the body and into which a second shaft of the plurality of shafts is inserted, and a tension hole disposed between the first hole and the second hole, and configured to prevent wear between the first shaft and the first hole and wear between the second shaft and the second hole due to folding or unfolding of the electronic device, and the hinge structure may be configured to maintain a predetermined angle defined by the first body and the second body due to a frictional force between the first hole and the first shaft, a frictional force between the second hole and the second shaft, and a frictional force between the gear blocks.

At least some of the plurality of gear blocks may include a gear structure that allows the first body and the second body to pivot with respect to each other as the first body and the second body interwork with each other.

The display may be slid when the electronic device is folded or unfolded, and the electronic device may further include a first bracket configured to support a first area of the display and connected to the first slide structure, a second bracket configured to support a second area of the display and connected to the second slide structure, and at least one electronic component disposed in a partial area of the first body and the second body exposed to the outside sliding of the display.

The electronic device may further include a first bracket configured to support a first area of the display and coupled to the first body, and a second bracket configured to support a second area of the display and coupled to the second body.

An interval of multi-joint parts disposed in at least one of the first body or the second body may become larger or smaller as the electronic device is folded or unfolded, or an interval between a plurality of joint parts that constitute the multi-link cover may become larger or smaller in correspondence to slide of at least one of the first body or the second body.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
a housing comprising a first body and a second body;

a flexible display disposed such that at least a portion of the flexible display is exposed through a first surface of the housing;

a multi-link cover connected to the first body and the second body, and comprising a plurality of joint parts pivotably coupled to each other; and at least one hinge structure, at least a portion of which is located in an interior of the multi-link cover, and configured to foldably connect the first body and the second body, wherein the multi-link cover has a height that is substantially the same as heights of the first body and the second body, wherein the plurality of joint parts are connected to each other by shafts disposed to cross each other, wherein the at least one hinge structure includes a gear hinge disposed between the first body and the second body, and wherein the gear hinge comprises a plurality of gear blocks and a plurality of shafts, wherein each of the shafts is connected to some of the plurality of gear blocks, and wherein the plurality of gear blocks pivots with respect to each other through the shafts.

2. The electronic device of claim 1, further comprising:
a first slide structure slidably coupled to the first body; and
a second slide structure slidably coupled to the second body.

3. The electronic device of claim 2, further comprising:
a first bracket configured to support a first area of the display and connected to the first slide structure; and
a second bracket configured to support a second area of the display and connected to the second slide structure,
wherein the first area and/or the second area of the display is slid along the first body and/or the second body as the electronic device is folded or unfolded.

4. The electronic device of claim 3, further comprising:
at least one electronic component disposed in a partial area of the first body and the second body exposed to the outside sliding of the display when the electronic device is folded or unfolded.

5. The electronic device of claim 2, further comprising:
a first bracket configured to support a first area of the display and coupled to the first body; and
a second bracket configured to support a second area of the display and coupled to the second body.

6. The electronic device of claim 5, wherein an interval of multi joint parts disposed in at least one of the first body or the second body becomes larger or smaller as the electronic device is folded or unfolded.

7. The electronic device of claim 5, wherein an interval between a plurality of joint parts that constitute the multi-link cover becomes larger or smaller in correspondence to slide of at least one of the first body or the second body.

8. The electronic device of claim 1, wherein the at least one hinge structure comprises:
a first hinge bridge connected to the first slide structure; and
a second hinge bridge connected to the second slide structure.

9. The electronic device of claim 1, wherein each of the gear blocks comprises:
an elliptical body;
a first hole disposed at an end of the elliptical body and into which a first shaft of the plurality of shafts is inserted;

a second hole disposed at an opposite end of the elliptical body and into which a second shaft of the plurality of shafts is inserted; and a tension hole disposed between the first hole and the second hole, wherein the tension hole is configured to prevent wear between the first shaft and the first hole and wear between the second shaft and the second hole due to folding or unfolding of the electronic device.

10. The electronic device of claim 9, wherein the gear hinge is configured to maintain a predetermined angle defined by the first body and the second body due to a frictional force between the first hole and the first shaft, a frictional force between the second hole and the second shaft, and a frictional force between the gear blocks.

11. The electronic device of claim 1, wherein at least some of the plurality of gear blocks comprise a gear structure that allows the first body and the second body to pivot with respect to each other as the first body and the second body interwork with each other.

12. The electronic device of claim 1, wherein ends of the multi-link cover and the hinge structure pivot with respect to opposite ends of the multi-link cover and the hinge structure by 180 degrees or by 360 degrees.

13. An electronic device comprising:
a housing comprising a first body and a second body;
a flexible display disposed such that at least a portion of the flexible display is exposed through a first surface of the housing;
a first slide structure slidably coupled to the first body;
a second slide structure slidably coupled to the second body;
a multi-link cover connected to the first slide structure and the second slide structure, and comprising a plurality of joint parts pivotably coupled to each other; and
at least one hinge structure, at least a portion of which is located in an interior of the multi-link cover, connected to the first slide structure and the second slide structure, and configured to foldably connect the first body and the second body,
wherein the multi-link cover has a height that is substantially the same as heights of the first body and the second body, and
wherein the plurality of joint parts are connected to each other by shafts disposed to cross each other.

14. The electronic device of claim 13, wherein the hinge structure comprises a plurality of gear blocks and a plurality of shafts,
wherein each of the shafts is connected to some of the plurality of gear blocks, and the plurality of gear blocks pivot with respect to each other through the shafts.

15. The electronic device of claim 14, wherein each of the gear blocks comprises:
an elliptical body;
a first hole disposed at an end of the body and into which a first shaft of the plurality of shafts is inserted;
a second hole disposed at an opposite end of the body and into which a second shaft of the plurality of shafts is inserted; and
a tension hole disposed between the first hole and the second hole, the tension hole configured to prevent wear between the first shaft and the first hole and wear between the second shaft and the second hole due to folding or unfolding of the electronic device, and
wherein the hinge structure is configured to maintain a predetermined angle defined by the first body and the second body due to a frictional force between the first hole and the first shaft, a frictional force between the second hole and the second shaft, and a frictional force between the gear blocks.

16. The electronic device of claim 14, wherein at least some of the plurality of gear blocks comprise a gear structure that allows the first body and the second body to pivot with respect to each other as the first body and the second body interwork with each other.

17. The electronic device of claim 13, wherein the display is slid when the electronic device is folded or unfolded, wherein the electronic device comprises:
 a first bracket configured to support a first area of the display and connected to the first slide structure;
 a second bracket configured to support a second area of the display and connected to the second slide structure; and
 at least one electronic component disposed in a partial area of the first body and the second body exposed to the outside sliding of the display.

18. The electronic device of claim 13, further comprising:
 a first bracket configured to support a first area of the display and coupled to the first body; and
 a second bracket configured to support a second area of the display and coupled to the second body.

19. The electronic device of claim 18, wherein an interval of multi joint parts disposed in at least one of the first body or the second body becomes larger or smaller as the electronic device is folded or unfolded, or
 wherein an interval between a plurality of joint parts that comprise the multi-link cover becomes larger or smaller in correspondence to slide of at least one of the first body or the second body.

20. An electronic device comprising:
 a housing comprising a first body and a second body;
 a multi-link cover connected to the first body and the second body, and comprising a plurality of joint parts pivotably coupled to each other; and
 at least one hinge structure, configured to connect the first body and the second body,
 wherein the at least one hinge structure comprises:
  a first hinge bridge connected to the first slide structure,
  a second hinge bridge connected to the second slide structure, and
  a gear hinge connected to the first hinge bridge and the second hinge bridge, the gear hinge comprising a plurality of gear blocks and a plurality of shafts.

* * * * *